(12) United States Patent
Matsumura et al.

(10) Patent No.: US 11,497,004 B2
(45) Date of Patent: Nov. 8, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 157 days.

(21) Appl. No.: 16/969,084

(22) PCT Filed: Feb. 15, 2018

(86) PCT No.: PCT/JP2018/005353
§ 371 (c)(1),
(2) Date: Aug. 11, 2020

(87) PCT Pub. No.: WO2019/159300
PCT Pub. Date: Aug. 22, 2019

(65) Prior Publication Data
US 2021/0037519 A1    Feb. 4, 2021

(51) Int. Cl.
*H04W 72/04* (2009.01)
*H04B 1/713* (2011.01)
*H04L 5/00* (2006.01)

(52) U.S. Cl.
CPC ........ *H04W 72/0413* (2013.01); *H04B 1/713* (2013.01); *H04L 5/0048* (2013.01); *H04W 72/0446* (2013.01)

(58) Field of Classification Search
CPC .......... H04W 72/0413; H04W 72/0446; H04B 1/713; H04L 5/0048; H04L 5/0019;
(Continued)

(56) References Cited

U.S. PATENT DOCUMENTS 10,601,566 B2 *  3/2020  Yin ........................ H04B 1/713
2009/0303937 A1  12/2009  Sawahashi et al.
(Continued)

FOREIGN PATENT DOCUMENTS

JP    2010171467 A    8/2010

OTHER PUBLICATIONS

Myung et al., English translation of U.S. Appl. No. 62/620,406, filed Jan. 22, 2018 (Year: 2018).*
(Continued)

*Primary Examiner* — Redentor Pasia
(74) *Attorney, Agent, or Firm* — Osha Bergman Watanabe & Burton LLP

(57) ABSTRACT

In future radio communication systems, uplink control channels will be transmitted properly. A user terminal has a receiving section that receives frequency hopping information, which indicates whether frequency hopping for an uplink control channel in one slot is enabled or not, and receives information that indicates the number of slots for the uplink control channel, and a control section that, when the number of slots is greater than one, controls repetition transmission of the uplink control channel, over a plurality of slots, by applying at least one of a spreading factor of a time-domain orthogonal cover code, a configuration of a demodulation reference code, and a base sequence, to the uplink control channel, based on the frequency hopping information.

9 Claims, 22 Drawing Sheets

(58) Field of Classification Search
CPC ... H04L 5/0053; H04L 5/0094; H04L 5/0012; H04L 27/26132; H04J 13/0047; H04J 13/20

See application file for complete search history.

(56) References Cited

U.S. PATENT DOCUMENTS

| | | | |
|---|---|---|---|
| 2011/0317745 | A1 | 12/2011 | Okubo et al. |
| 2018/0279296 | A1* | 9/2018 | Hosseini ............ H04W 72/0413 |
| 2018/0323932 | A1* | 11/2018 | Huang .................. H04L 5/0051 |
| 2019/0052421 | A1* | 2/2019 | Yin .......................... H04L 5/005 |
| 2019/0052422 | A1* | 2/2019 | Yin ....................... H04B 1/7143 |
| 2019/0261356 | A1* | 8/2019 | Myung ................. H04W 48/12 |
| 2019/0280734 | A1* | 9/2019 | Park ....................... H04L 5/0012 |

OTHER PUBLICATIONS

International Search Report issued in Application No. PCT/JP2018/005353, dated May 1, 2018 (5 pages).
Written Opinion issued in International Application No. PCT/JP2018/005353, dated May 1, 2018 (5 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TS 38.211 V15.0.0, Release 15; "3rd Generation Partnership Project; Technical Specification Group Radio Access Network; NR; Physical channels and modulation;" Dec. 2017; Sophia Antipolis Valbonne, France (73 pages).
3GPP TSG RAN WG1 Meeting #91; R1-1720615; "DMRS for NR long PUCCH for more than 2 bits;" Sharp; Nov. 27-Dec. 1, 2017; Reno, USA (3 pages).
3GPP TSG RAN WG1 Meeting AH 1801; R1-1801269; "WF on base-sequence hopping for PUCCH (updated);" NTT Docomo, Inc.; Jan. 22-26, 2018; Vancouver, Canada (4 pages).
3GPP TSG RAN WG1 Meeting AH 1801; R1-1800786; "Remaining issues on long PUCCH over multiple slots;" Wilus Inc.; Jan. 22-26, 2018; Vancouver, Canada (4 pages).
Office Action issued in the counterpart Chilean Patent Application No. 202002106, dated Oct. 15, 2021 (22 pages).
Extended European Search Report issued in counterpart European Patent Application No. 18906287.0, dated Sep. 3, 2021 (12 pages).
3GPP Draft: List of RAN 1 Agreements, 3rd Generation Partnership Project (3GPP), Mobile Competence Centre; Dec. 17, 2017 (195 pages).
Lenovo, Motorola Mobility; "Remaining issues on long PUCCH design for UCI of more than 2 bits"; 3GPP TSG RAN WG1 #91, R1-1719748; Reno, United States of America; Nov. 27-Dec. 1, 2017 (4 pages).
Ericsson; "On the Design of Long PUCCH for up to 2 bits"; 3GPP TSG RAN WG1 Meeting#90bis, R1-1718635 Prague, Czech Republic; Oct. 9-13, 2017 (15 pages).
ZTE, Sanechips; "Miscellaneous changes related to short PUCCH"; 3GPP TSG RAN WG1 Meeting AH 1801, R1-1800133; Vancouver, Canada; Jan. 22-26, 2018 (9 pages).
Huawei, HiSilicon; "Review Summary for A1 7.3.2 2. PUCCH structure in long-duration"; 3GPP TSG RAN WG1 Ad-Hoc Meeting, R1-1801145; Vancouver, Canada; Jan. 22-26, 2018 (21 pages).
Office Action issued in the counterpart Chinese Patent Application No. 201880092319.8, dated Sep. 23, 2021 (14 pages).
Office Action issued in Indian Application No. 202037038782 dated May 5, 2022 (6 pages).
Office Action issued in the counterpart Chilean Patent Application No. 202002106, dated Jun. 22, 2022 (22 pages).

* cited by examiner

| PUCCH LENGTH | SF | | |
|---|---|---|---|
| | WITHOUT INTRA-SLOT HOPPING | WITH INTRA-SLOT HOPPING | |
| | | FIRST HOP | SECOND HOP |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

FIG. 2

| SF | φ | | | | | | |
|---|---|---|---|---|---|---|---|
| | 0 | 1 | 2 | 3 | 4 | 5 | 6 |
| 2 | [0 0] | [0 1] | - | - | - | - | - |
| 3 | [0 0 0] | [0 1 2] | [0 2 1] | - | - | - | - |
| 4 | [0 0 0 0] | [0 2 0 2] | [0 0 2 2] | [0 2 2 0] | - | - | - |
| 5 | [0 0 0 0 0] | [0 1 2 3 4] | [0 2 4 1 3] | [0 3 1 4 2] | [0 4 3 2 1] | - | - |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | - |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

FIG. 3

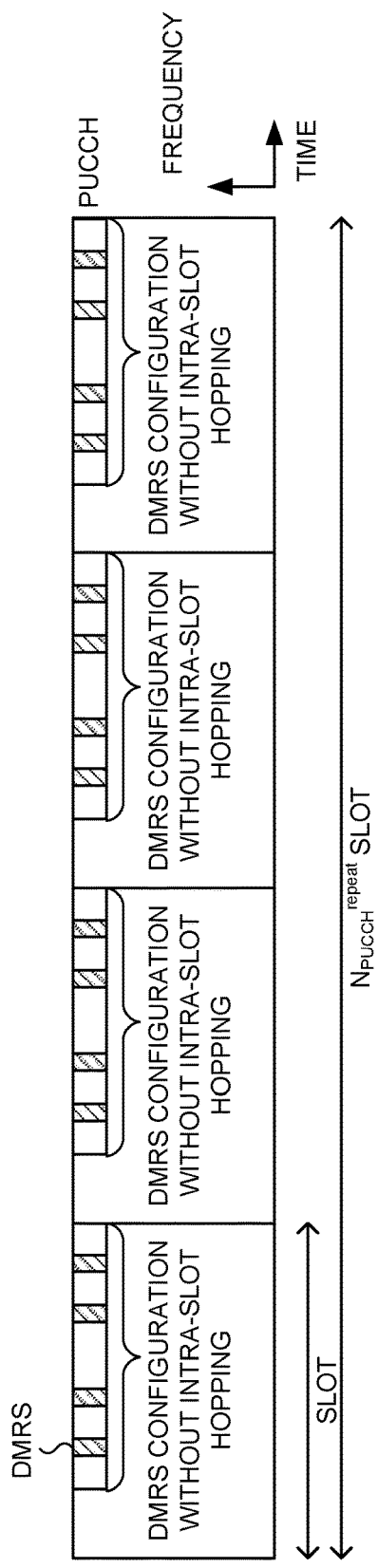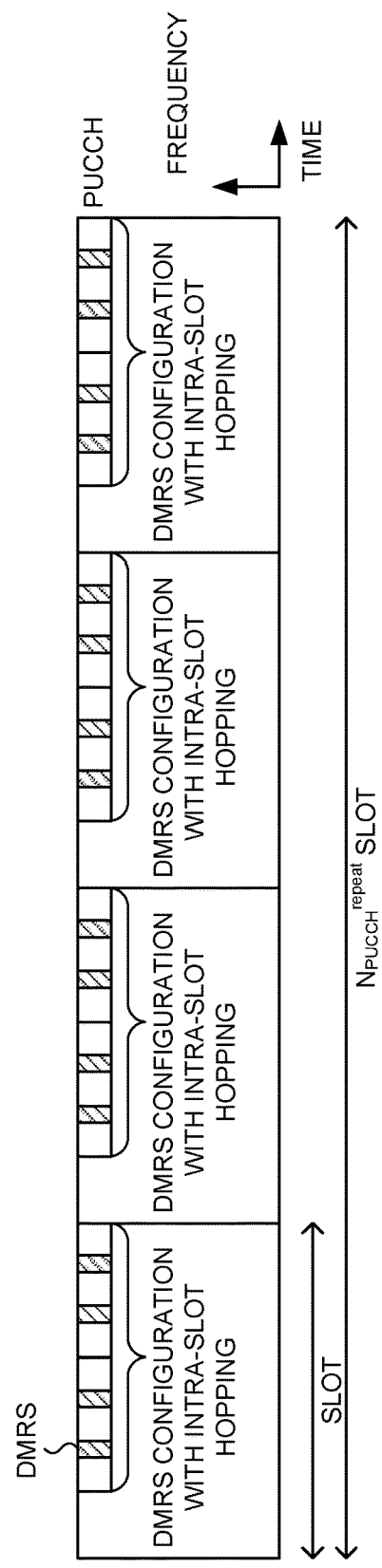

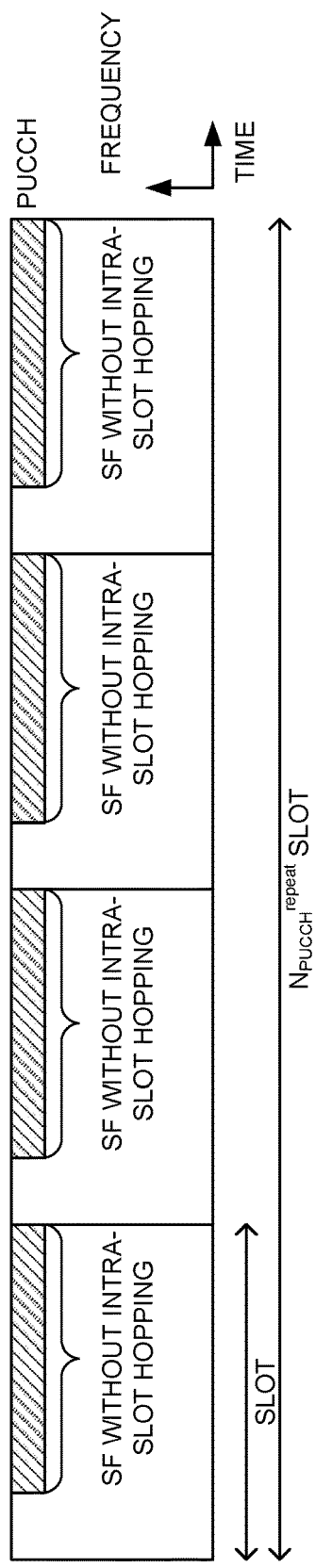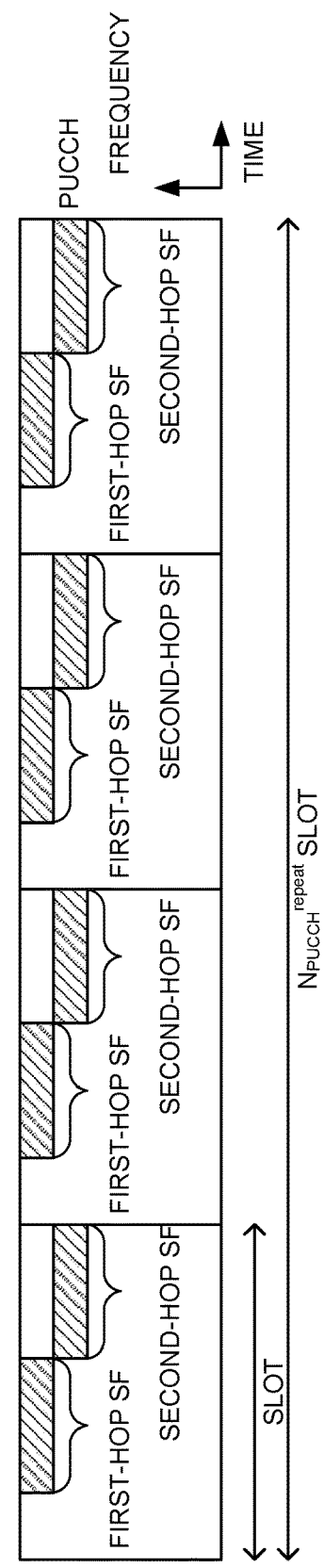

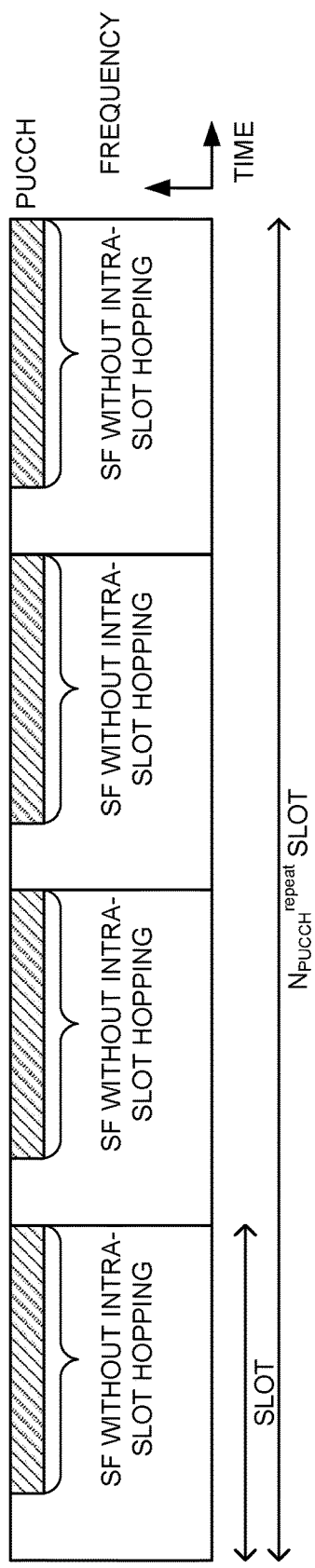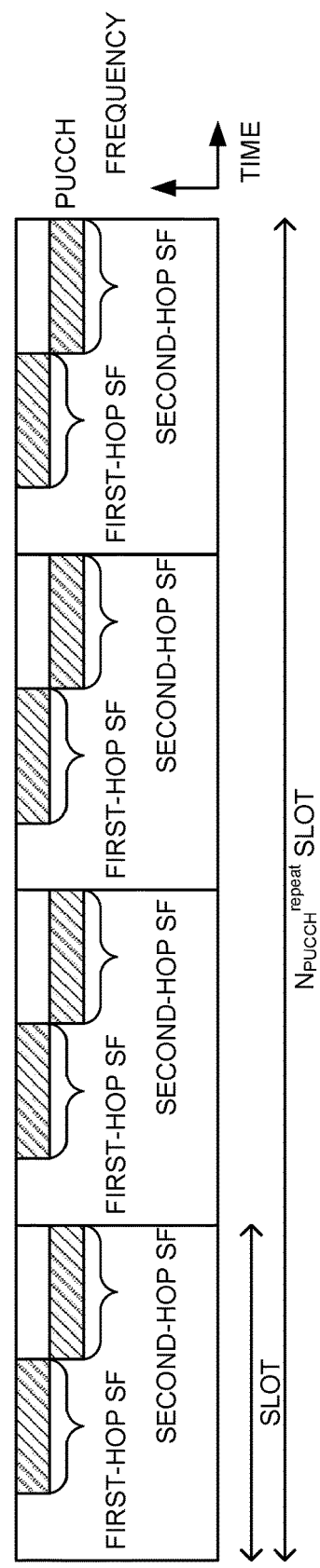

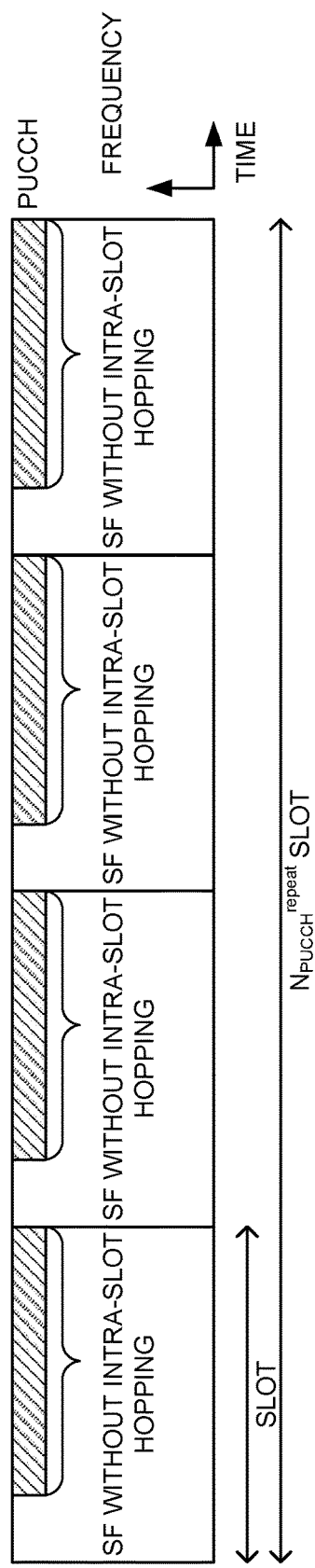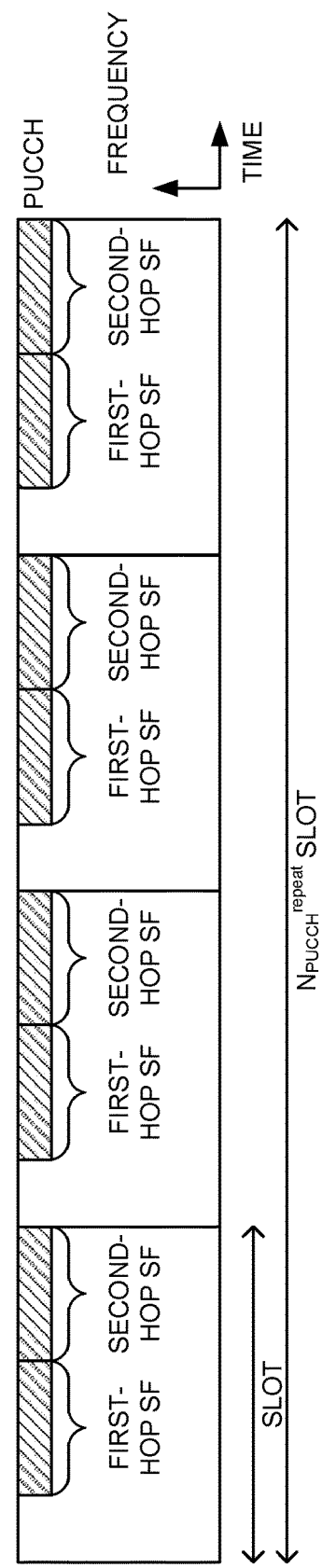

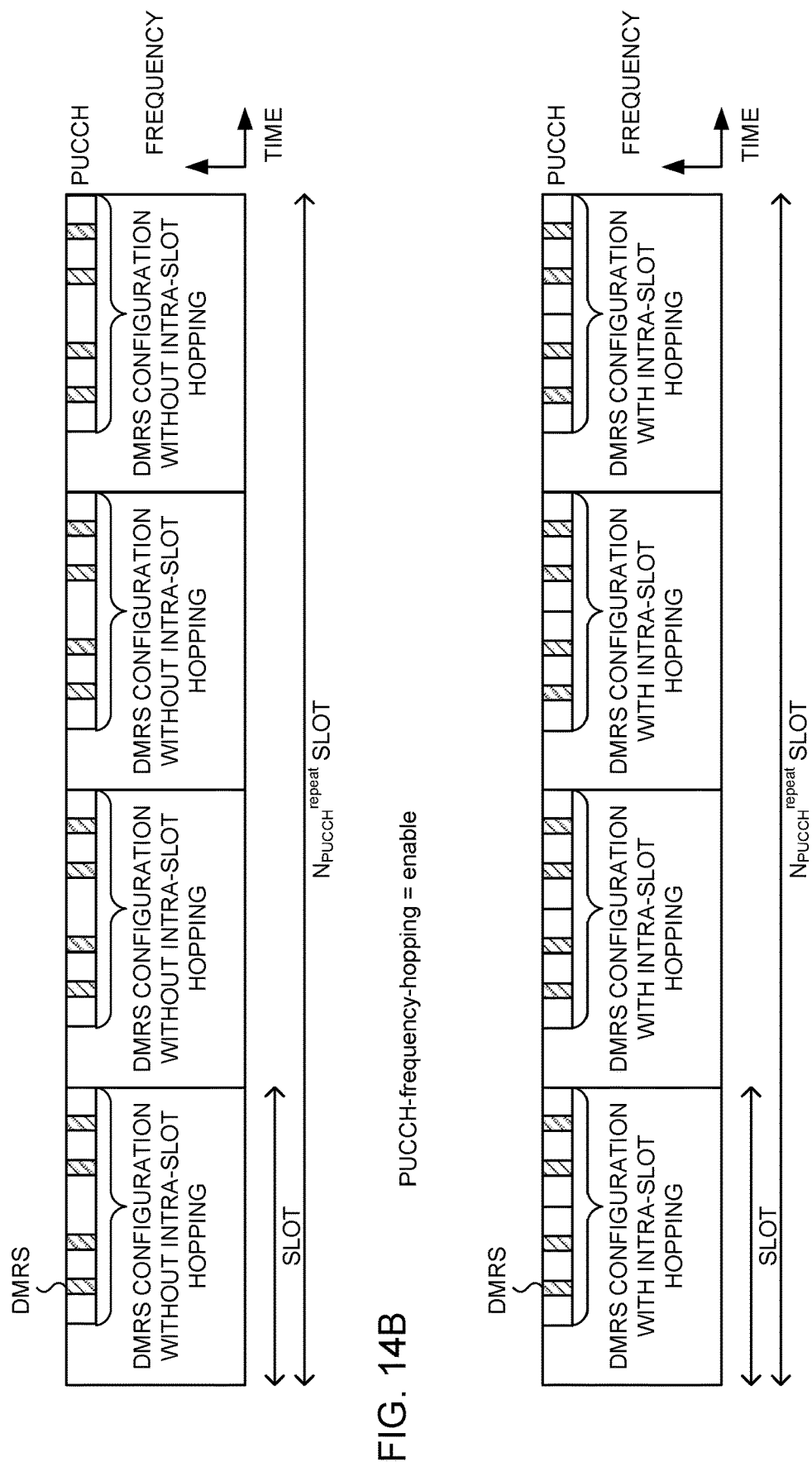

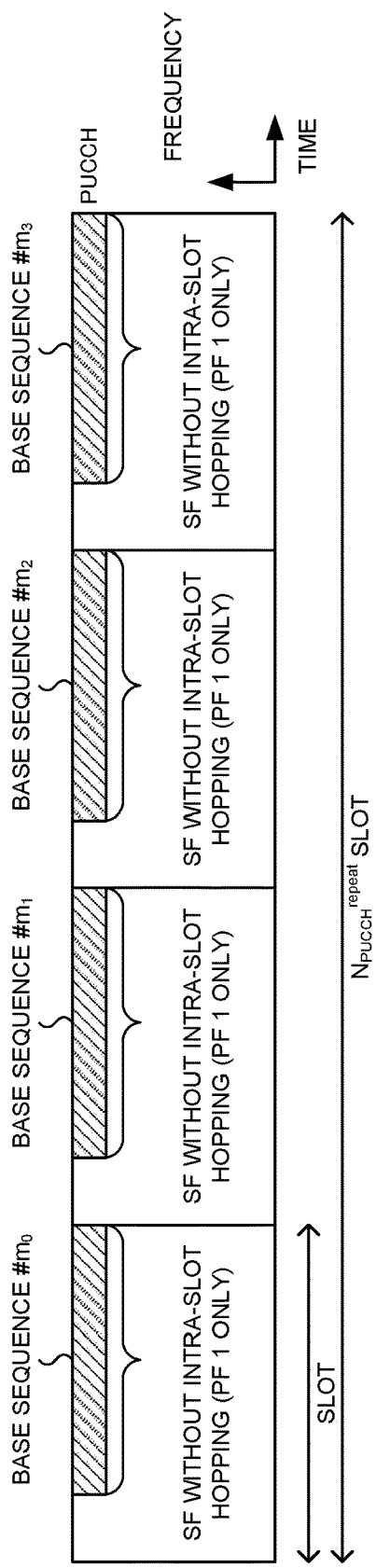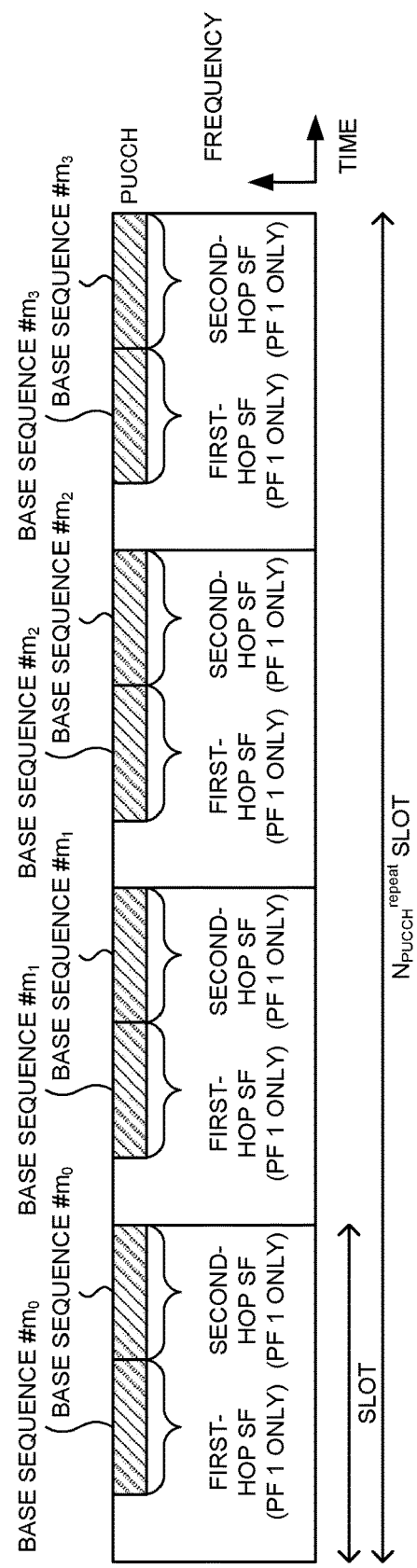

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, for the purpose of achieving further broadbandization and increased speed beyond LTE, successor systems of LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on) are also under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes each serve as the unit of time for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, PUCCH (Physical Uplink Control CHannel)) or an uplink data channel (for example, PUSCH (Physical Uplink Shared CHannel)). The format of the uplink control channel is referred to as "PUCCH format (PF)" or the like.

Furthermore, in existing LTE systems, a user terminal multiplexes and transmits UL channels and DMRSs (De-Modulation Reference Signals) in TTIs of 1 ms. In these 1-ms TTIs, multiple DMRSs of different layers of the same user terminal (or different user terminals) are orthogonal-multiplexed by using cyclic shifts (CSs) and/or orthogonal spreading codes (for example, orthogonal cover codes (OCCs)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 15 and later versions, 5G, 5G+, NR, etc.), studies are underway to select resources (for example, PUCCH resources) for an uplink control channel (for example, PUCCH), based on higher layer signaling and a given field value in downlink control information (DCI), when UCI is transmitted using the uplink control channel. In addition, studies are underway to have PUCCH resources include a number of parameters.

Unless a user terminal properly interprets the parameters included in PUCCH resources that are selected, it may not be possible to transmit the PUCCH properly.

The present invention has been made in view of the above, and it is therefore an object of the present invention to provide a user terminal and a radio communication method, whereby an uplink control channel can be transmitted properly.

Solution to Problem

In accordance with one aspect of the present invention, a user terminal has a receiving section that receives frequency hopping information, which indicates whether frequency hopping for an uplink control channel in one slot is enabled or not, and receives information that indicates the number of slots for the uplink control channel, and a control section that, when the number of slots is greater than one, controls repetition transmission of the uplink control channel, over a plurality of slots, by applying at least one of a spreading factor of a time-domain orthogonal cover code, a configuration of a demodulation reference code, and a base sequence, to the uplink control channel, based on the frequency hopping information.

Advantageous Effects of Invention

According to the present invention, an uplink control channel can be transmitted properly in future radio communication systems.

BRIEF DESCRIPTION OF DRAWINGS

FIG. 2 is a diagram to show an example of association between PUCCH lengths and SFs;

FIG. 3 is a diagram to show an example of association between SFs and time-domain OCCs;

FIGS. 5A and 5B are diagrams to show examples of the method of determining DMRS configuration according to a second example of the present invention;

FIGS. 8A and 8B are diagrams to show examples of the method of determining SF according to a fourth example of the present invention;

FIGS. 9A and 9B are diagrams to show examples of the method of determining SF according to a fifth example of the present invention;

FIGS. 13A and 13B are diagrams to show examples of the method of determining SF according to an eighth example of the present invention;

FIGS. 14A and 14B are diagrams to show examples of the method of determining DMRS configuration according to a ninth example of the present invention;

FIGS. 15A and 15B are diagrams to show examples of the method of determining a base sequence and SF according to an example 10-1 of the present invention;

DESCRIPTION OF EMBODIMENTS

Figure 1:
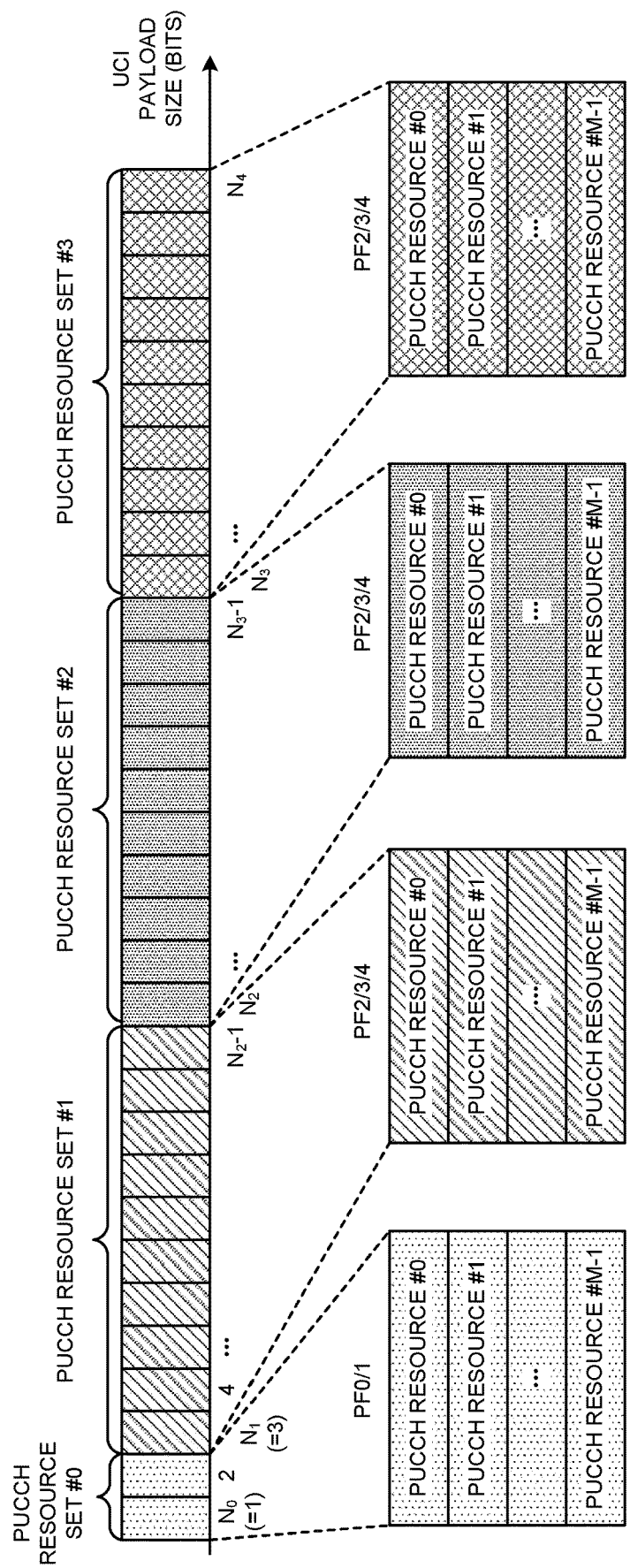
FIG. 1 is a diagram to show an example of allocation of PUCCH resources.

Envisaging future radio communication systems (for example, LTE Rel. 15 and later versions, 5G, NR, etc.), formats for uplink control channels (for example, PUCCH) to use to transmit UCI (also referred to as "PUCCH formats (PFs)," and/or the like) are under study. For example, LTE Rel. 15 is under research to support five types of formats, namely PF 0 to PF 4. Note that the names of PFs in the following description are simply examples, and different names may be used.

For example, PFs 0 and 1 are PFs that are used to transmit UCI of up to two bits (for example, delivery acknowledgment information (also referred to as "HARQ-ACK (Hybrid Automatic Repeat reQuest-ACKnowledgment)," "ACK or NACK," etc.)). PF 0 can be allocated to one or two symbols, and therefore, is also referred to as "short PUCCH," "sequence-based short PUCCH" and the like. Meanwhile, PF 1 can be allocated to four to fourteen symbols, and therefore, is also referred to as "long PUCCH" and the like. In PF 1, a number of user terminals may be code-division-multiplexed (CDM) by time-domain block-wise spreading, which uses at least one of cyclic shifts (CSs) and orthogonal sequences (for example, OCCs (Orthogonal Cover Codes), time-domain OCCs, etc.) in the same resource block (physical resource block (PRB)).

PFs 2 to 4 are the PFs that are used to transmit UCI of more than two bits (for example, channel state information (CSI) (or CSI and an HARQ-ACK and/or a scheduling request (SR))). PF 2 can be allocated to one or two symbols, and therefore is also referred to as "short PUCCH" or the like. Meanwhile, PFs 3 and 4 can be allocated to four to fourteen symbols, and therefore, are also referred to as "long PUCCH" and the like. In PF 4, UCI for a number of user terminals may be code-division-multiplexed (CDM) by using orthogonal sequences (for example, OCCs, pre-DFT OCCs, frequency-domain OCCs, etc.), and by using pre-DFT (frequency-domain) block-wise spreading. In PF 4, UCI for a number of user terminals may be code-division-multiplexed (CDM) by using demodulation reference signals (DMRSs), and by using pre-DFT (frequency-domain) block-wise spreading.

Resources (for example, PUCCH resources) that are used to transmit this uplink control channel are allocated by using higher layer signaling and/or downlink control information (DCI). Here, higher layer signaling may refer to, for example, at least one of RRC (Radio Resource Control) signaling, system information (for example, at least one of RMSI (Remaining Minimum System Information), OSI (Other System Information), MIB (Master Information Block) and SIB (System Information Block)), and broadcast information (PBCH (Physical Broadcast CHannel)).

To be more specific, one or more sets (PUCCH resource sets), each includes one or more PUCCH resources, are reported to (configured in) a user terminal via higher layer signaling. For example, K PUCCH resource sets (where, for example, $1 \leq K \leq 4$) may be reported from a radio base station to the user terminal. Each PUCCH resource set may be comprised of M PUCCH resources (where, for example, $4 \leq M \leq 8$).

The user terminal may select a single PUCCH resource set, out of the K PUCCH resource sets that are configured, based on the payload size of the UCI (or "UCI payload size"). The UCI payload size may be the number of UCI bits, not including the cyclic redundancy check (CRC) bits.

The user terminal may select the PUCCH resource to use to transmit the UCI, out of the M PUCCH resources included in the selected PUCCH resource set, based on at least one of DCI and implicit information (also referred to as "implicit indication information," "implicit index," etc.).

FIG. 1 is a diagram to show an example of allocation of PUCCH resources. Referring to FIG. 1, K=4 holds as an example, and four PUCCH resource sets #0 to #3 are configured from the radio base station to the user terminal via higher layer signaling. Furthermore, PUCCH resource sets #0 to #3 each include M PUCCH resources #0 to #M−1 (where, for example, $4 \leq M \leq 8$). Note that these PUCCH resource sets may all include the same number of PUCCH resources, or include different numbers of PUCCH resources.

In FIG. 1, each PUCCH resource configured in the user terminal may include at least one of the following parameter values (these parameters may be also referred to as "fields," "information," etc.). Note that, for each parameter, a range of possible values may be defined, per PUCCH format.

- The symbol where the PUCCH starts being allocated (the starting symbol, the first symbol, etc.);
- The number of symbols allocated to the PUCCH in a slot (the duration allocated to the PUCCH);
- The index of the resource block where the PUCCH starts being allocated (the starting PRB, the first (lowest) PRB, etc.) (for example, PUCCH-starting-PRB);
- The number of PRBs allocated to the PUCCH (for example, for PF 2 or 3);
- Whether frequency hopping is enabled or disabled for PUCCH resources (for example, PUCCH-frequency-hopping);

The frequency resource after frequency hopping (second hop) (for example, the index of the starting PRB or the first (lowest) PRB in a second hop, PUCCH-2nd-hop-PRB, etc.);

The index of the initial cyclic shift (CS) (for example, for PF 0 or 1);

The index of an orthogonal sequence in the time domain (for example, a time-domain OCC) (for example, for PF 1);

The length of the orthogonal sequence (for example, pre-DFT OCC) used in block-wise spreading before the discrete Fourier transform (DFT) (also referred to as "pre-DFT OCC length," "spreading factor," etc.) (for example, for PF 4); and The index of the orthogonal sequence for use in pre-DFT block-wise spreading (for example, pre-DFT OCC) (for example, for PF 4).

As shown in FIG. 1, when PUCCH resource sets #0 to #3 are configured in a user terminal, the user terminal selects one of the PUCCH resource set based on UCI payload size.

For example, when the UCI payload size is one or two bits, PUCCH resource set #0 is selected. Also, when the UCI payload size is three bits or more and $N_2-1$ bits or less, PUCCH resource set #1 is selected. Furthermore, when the UCI payload size is $N_2$ bits or more and $N_3-1$ bits or less, PUCCH resource set #2 is selected. Similarly, when the UCI payload size is $N_3$ bits or more and $N_3-1$ bits or less, PUCCH resource set #3 is selected.

In this way, the range of UCI payload size in which PUCCH resource set #i (i=0, . . . , K−1) is selected is expressed as $N_i$ bits or more and $N_{i+1}-1$ bits or less (that is, $\{N_i, \ldots, N_{i+1}-1\}$ bits).

Here, the starting locations (the numbers of starting bits) $N_0$ and $N_1$ for the UCI payload sizes for PUCCH resource sets #0 and #1 may be 1 and 3, respectively. By this means, PUCCH resource set #0 is selected when UCI of up to two bits is transmitted, so that PUCCH resource set #0 may include PUCCH resources #0 to #M−1 for at least one of PF 0 and PF 1. On the other hand, one of PUCCH resource sets #1 to #3 is selected when UCI of more than two bits is transmitted, so that PUCCH resource sets #1 to #3 may include PUCCH resources #0 to #M−1 for at least one of PF 2, PF 3 and PF 1, respectively.

If i=2, . . . , K−1 holds, information to show the starting location ($N_i$) of the UCI payload size for PUCCH resource set #i (starting location information) may be reported to (configured in) the user terminal by using higher layer signaling. This starting location ($N_i$) may be user terminal-specific. For example, the starting location ($N_i$) may be configured to a value in a range of 4 bits to 256 bits (for example, a multiple of four). For example, referring to FIG. 1, information to show the starting locations ($N_2$ and $N_3$) of the UCI payload sizes for PUCCH resource sets #2 and #3 are reported to the user terminal via higher layer signaling (for example, user-specific RRC signaling), respectively.

The maximum UCI payload size for each PUCCH resource set is given by $N_K-1$. $N_K$ may be explicitly reported to (configured in) the user terminal by higher layer signaling and/or DCI, or may be derived implicitly. For example, in FIG. 1, $N_0=1$ and $N_1=3$ may be specified in the specification, and $N_2$ and $N_3$ may be reported via higher layer signaling. Also, $N_4$ may be specified in the specification (for example, $N_4=1000$).

In the case shown in FIG. 1, the user terminal can determine a single PUCCH resource to use to transmit UCI, out of PUCCH resources #0 to #M−1 included in the PUCCH resource set selected based on the UCI payload size, based on the value of a given field in DCI and/or other parameters. For example, when the number of bits in this given field is two, four types of PUCCH resources can be specified. Other parameters may be a CCE index. For example, a PUCCH resource may be associated with a combination of a two-bit DCI and another parameter, or may be associated with a three-bit DCI.

For example, where there are a number of PUCCH resource sets configured by higher layer, if UCI is an HARQ-ACK, the user terminal (user equipment (UE)) may determine one PUCCH resource set, out of a number of PUCCH resource sets configured by higher layer, based on the UCI payload size, and determine one PUCCH resource from the determined PUCCH resource set based on DCI and/or another parameter. The above-described method of reporting a PUCCH resource by using a PUCCH resource set may be also used when UCI is encoded with an HARQ-ACK and another UCI (for example, CSI and/or an SR) and transmitted simultaneously.

On the other hand, when UCI includes no HARQ-ACK, PUCCH resources may be reported without using PUCCH resource sets. For example, if UCI is CSI and/or an SR, the UE may use PUCCH resources that are configured semi-statically by higher layer.

Also, the number of slots for transmitting the PUCCH (the number of PUCCH slots, the number of PUCCH repetitions, etc.), or $N_{PUCCH}^{repeat}$, may be configured in the UE by means of a higher layer parameter (for example, PUCCH-F1-number-of-slots for PF 1, PUCCH-F3-number-of-slots for PF 3, or PUCCH-F4-number-of-slots for PF 4). If $N_{PUCCH}^{repeat}$ is greater than one, the UE transmits the PUCCH over multiple slots ($N_{PUCCH}^{repeat}$ at slots).

The UE repeats the UCI in the PUCCH transmission of the first slot of $N_{repeat}$ slots, in the PUCCH transmission in each of the rest of the $N_{repeat}-1$ slots.

Furthermore, in PF 1, the number of user terminals to be multiplexed using time-domain OCCs is determined based on the duration of PUCCH (long-PUCCH duration, the number of symbols, etc.). The maximum number of user terminals to be multiplexed using time-domain OCCs may be paraphrased as "OCC multiplexing capacity," "OCC length," "spreading factor (SF)" and so on.

When UEs are multiplexed using cyclic shifts (CSs) in addition to time-domain OCCs, the maximum value of multiplexing capacity in a given resource is the maximum value of the OCC multiplexing capacity×the number of CSs. The number of CSs may be a given value (for example, 12).

When time-domain OCCs are applied to a PUCCH (for example, PF 1), from the perspective of maintaining orthogonality, the same base sequence needs to be used (the same base sequence needs to be applied) within a period where one time-domain OCC is multiplied. Note that different values may be applied to the cyclic shifts to apply to the base sequence within the period where one time-domain OCC is multiplied.

As shown in FIG. 2, the SFs of time-domain OCCs for PUCCH format 1 may be associated with PUCCH lengths (the numbers of PUCCH symbols). SFs without intra-slot hopping (with no intra-slot hopping) and SFs with intra-slot hopping may be associated with PUCCH lengths. When intra-slot hopping is carried out once, SFs with intra-slot hopping may include an SF for the first hop (1st hop, before frequency hopping, and hopping index m=0) and an SF for the second hop (2nd hop, after frequency hopping, and hopping index m=1). In this way, a table to show the SFs for each value of PUCCH length may be defined in the specification.

As shown in FIG. 3, SFs may be associated with as many time-domain OCCs as the SFs. Here, the time-domain OCC is represented by exp(j2πφ/SF), and FIG. 3 shows φ, which determines the time-domain OCC. In this way, a table to show at least one time-domain OCC for each value of SF may be defined in the specification.

The association between PUCCH lengths and SFs and the association between SFs and time-domain OCCs may be configured in advance, or may be defined in the specification.

As for the parameters included in PUCCH resources, for frequency hopping, whether frequency hopping of PUCCH resources is enabled or disabled may be indicated by a higher layer parameter (for example, PUCCH-frequency-hopping). The index of the first PRB (the lowest PRB) before frequency hopping or when frequency hopping is not used may be indicated by a higher layer parameter (for example, PUCCH-starting-PRB). The index of the first PRB (the lowest PRB) after frequency hopping may be indicated by PUCCH-2nd-hop-PRB, for example.

However, the details of UE operations in accordance with the configuration of frequency hopping have not been determined yet. For example, it is not clear how the UE operates based on parameters related to frequency hopping, such as PUCCH-frequency-hopping. So, the present inventors have worked on UE operations in accordance with the configuration of PUCCH frequency hopping, and arrived at the present invention.

Now, embodiments of the present invention will be described below in detail. The embodiments described below may be each used alone, or may be used in combinations.

First Example

With a first example of the present invention, a method, by which UE determines the SF for PUCCH format 1 when the UE is configured with PUCCH-starting-PRB, PUCCH-2nd-hop-PRB and PUCCH-frequency-hopping (or three parameters equivalent to these), PUCCH-starting-PRB and PUCCH-2nd-hop-PRB are mutually equal, and PUCCH transmission over a number of slots is configured, will be described below.

Assume that the UE is configured with $N_{PUCCH}^{repeat}$, which is the number of PUCCH slots, greater than one, via higher layer signaling (for example, PUCCH-F1-number-of-slots).

SFs for PUCCH format 1 are associated with PUCCH lengths, SFs without intra-slot hopping and SFs with intra-slot hopping are associated with PUCCH lengths, and SFs with intra-slot hopping include first-hop SFs and second-hop SFs (see, for example, FIG. 2). Also, time-domain OCC sequences are associated with SFs (see, for example, FIG. 3).

Note that the UE may use SFs with intra-slot hopping even if the UE does not actually perform intra-slot frequency hopping for PUCCH.

The UE may determine the SF based on PUCCH-starting-PRB, PUCCH-2nd-hop-PRB, and PUCCH-frequency-hopping, among the PUCCH resources that are configured.

Figure 4A:
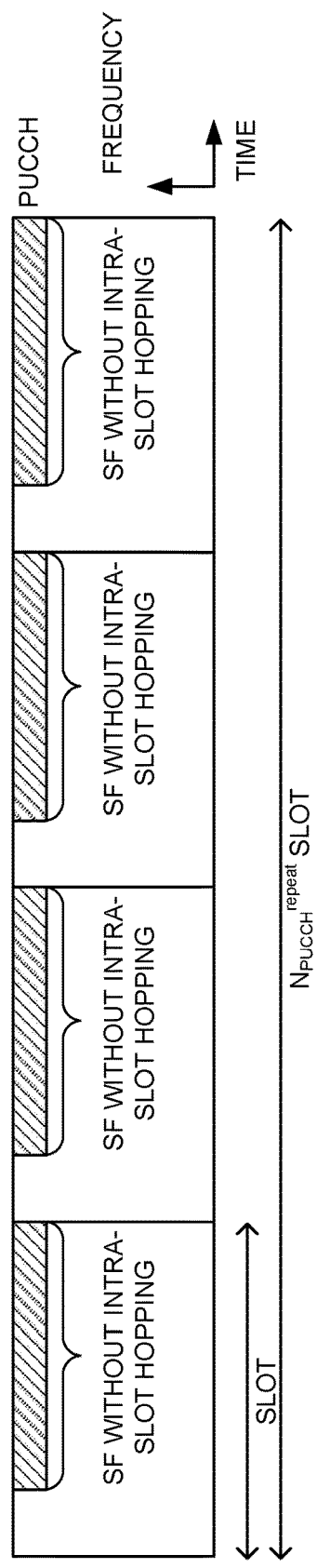
FIGS. 4A and 4B are diagrams to show examples of the method of determining SF according to a first example of the present invention.

If PUCCH-starting-PRB is equal to PUCCH-2nd-hop-PRB and PUCCH-frequency-hopping is disabled, as shown in FIG. 4A, the UE may use an SF without intra-slot hopping. In this case, intra-slot frequency hopping is not applied to the UE, and the UE may perform repetitions of transmitting the PUCCH in one slot where an SF without intra-slot hopping is applied, over $N_{PUCCH}^{repeat}$ slots. In this example, $N_{PUCCH}^{repeat}=4$ holds.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

Figure 4B:
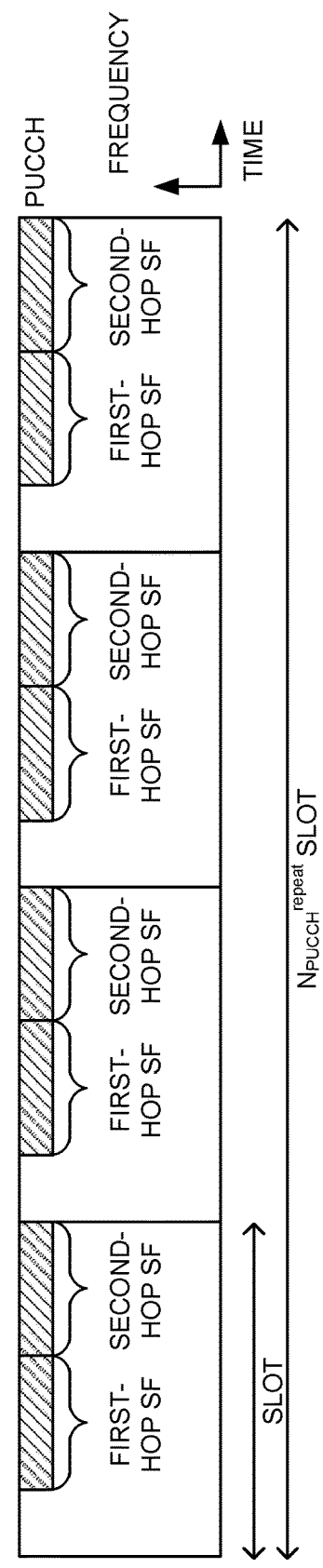

If PUCCH-starting-PRB is equal to PUCCH-2nd-hop-PRB and PUCCH-frequency-hopping is enabled, as shown in FIG. 4B, the UE may use SFs with intra-slot hopping. In this case, the UE may use the first-hop SF before the frequency hopping timing, and use the second-hop SF after the frequency hopping timing. Here, the above frequency hopping timing may be the same as the frequency hopping timing for when PUCCH-starting-PRB is different from PUCCH-2nd-hop-PRB and PUCCH-frequency-hopping is enabled. For example, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, intra-slot frequency hopping is not applied to the UE, and the UE may perform repetitions of transmitting the PUCCH in one slot where SFs with intra-slot hopping are applied, over $N_{PUCCH}^{repeat}$ slots. In this example, $N_{PUCCH}^{repeat}=4$ holds.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

According to the first example, the NW (network, including, for example, a radio base station, a gNB, etc.) can flexibly change the SF (the OCC length or the OCC multiplexing capacity) based on the configuration of frequency hopping.

Second Example

With a second example of the present invention, a method, by which UE determines the DMRS configurations for PUCCH format 3 and/or 4 when the UE is configured with PUCCH-starting-PRB, PUCCH-2nd-hop-PRB and PUCCH-frequency-hopping (or three parameters equivalent to these) PUCCH-starting-PRB and PUCCH-2nd-hop-PRB are mutually equal, and PUCCH transmission over a number of slots is configured, will be described below. The DMRS configuration may be the locations (for example, the symbols) of the DMRS.

Assume that the UE is configured with $N_{PUCCH}^{repeat}$, which is the number of PUCCH slots, greater than one, via higher layer signaling (for example, PUCCH-F3-number-of-slots or PUCCH-F4-number-of-slots).

Similar to the case of SFs, for the DMRS configurations for PUCCH format 3 and/or 4, DMRS configurations without intra-slot hopping (that is, with no intra-slot hopping) and DMRS configurations with intra-slot hopping may be defined in the specification. A DMRS configuration with intra-slot hopping may include a DMRS configuration for the first hop and a DMRS configuration for the second hop.

The UE may determine the DMRS configuration based on PUCCH-starting-PRB, PUCCH-2nd-hop-PRB, and PUCCH-frequency-hopping, among the PUCCH resources configured.

If PUCCH-starting-PRB is equal to PUCCH-2nd-hop-PRB and PUCCH-frequency-hopping is disabled, as shown in FIG. 5A, the UE may use a DMRS configuration without intra-slot hopping. In this case, intra-slot frequency hopping is not applied to the UE, and the UE may perform repetitions of transmitting the PUCCH in one slot where a DMRS configuration without intra-slot hopping is applied, over $N_{PUCCH}^{repeat}$ slots. In this example, $N_{PUCCH}^{repeat}=4$ holds.

If PUCCH-starting-PRB is equal to PUCCH-2nd-hop-PRB and PUCCH-frequency-hopping is enabled, as shown in FIG. 5B, the UE may use a DMRS configuration with intra-slot hopping. In this case, the UE may use the first-hop DMRS configuration before the frequency hopping timing, and use the second-hop DMRS configuration after the frequency hopping timing. Here, the above frequency hopping timing may be the same as the frequency hopping timing for when PUCCH-starting-PRB is different from PUCCH-2nd-hop-PRB and PUCCH-frequency-hopping is enabled. For example, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, intra-slot frequency hopping is not applied to the UE, and the UE may perform repetitions of transmitting the PUCCH in one slot where a DMRS configuration with intra-slot hopping is applied, over $N_{PUCCH}^{repeat}$ slots. In this example, $N_{PUCCH}^{repeat}=4$ holds.

Note that the locations of the DMRS where frequency hopping is not applied may be the same as the locations of the DMRS where frequency hopping is applied.

According to the second example, the NW can flexibly change the DMRS configuration based on the configuration of frequency hopping.

Third Example

With a third example of the present invention, a method, by which UE determines the base sequence for at least one of PUCCH formats 0 to 4 (in particular, PUCCH formats 1, 3 and 4) and/or the SF for PUCCH format 1 when the UE is configured with PUCCH-starting-PRB, PUCCH-2nd-hop-PRB and PUCCH-frequency-hopping (or three parameters equivalent to these), PUCCH-starting-PRB and PUCCH-2nd-hop-PRB are mutually equal, and PUCCH transmission over a number of slots is configured, will be described below. The base sequence may be represented by a base sequence index.

The base sequence may be a CAZAC (Constant Amplitude Zero Auto-Correlation) sequence such as a Zadoff-Chu sequence (for example, a low-PAPR (Peak-to-Average Power Ratio) sequence), may be a sequence defined in the specification (for example, a low-PAPR sequence), or may be a pseudo spreading sequence (for example, a Gold sequence). For example, a PUCCH having a bandwidth of one PRB may use one of a given number of sequences (where the given number may be, for example, 30, 60 or a given value that is determined from the length of the base sequence) defined in the specification, as a base sequence. The base sequence may be used for UCI, or may be used for the DMRS.

Assume that the UE is configured with $N_{PUCCH}^{repeat}$, which is the number of PUCCH slots, greater than one, via higher layer signaling (for example, PUCCH-F1-number-of-slots, PUCCH-F3-number-of-slots, or PUCCH-F4-number-of-slots).

Similar to the first example, for SFs for PUCCH format 1, SFs without intra-slot hopping and SFs with intra-slot hopping may be configured in advance, or may be defined in the specification.

The UE may determine the base sequence and/or the SF based on PUCCH-starting-PRB, PUCCH-2nd-hop-PRB and PUCCH-frequency-hopping, among the PUCCH resources configured.

As base sequence hopping, a method of hopping the base sequence per slot (on a slot level) and a method of hopping the base sequence at the timing of frequency hopping (per OCC length) (on a frequency-hop level, a time-domain-OCC level, etc.) may be possible.

Example 3-1

A case will be described, with example 3-1, in which base sequence hopping on a slot level is applied.

Figure 6A:
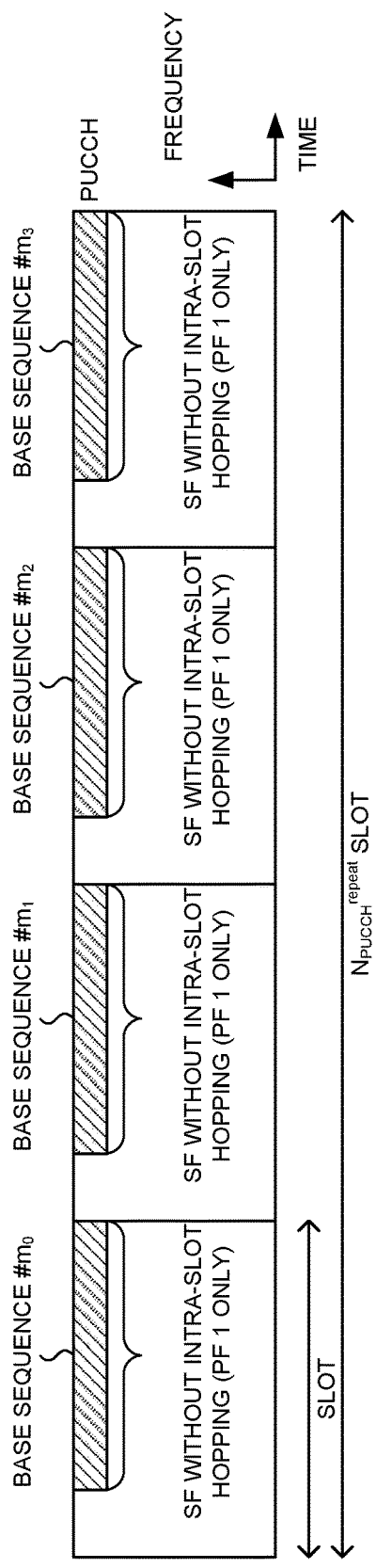
FIGS. 6A and 6B are diagrams to show examples of the method of determining a base sequence and SF according to an example 3-1 of the present invention.

If PUCCH-starting-PRB is equal to PUCCH-2nd-hop-PRB and PUCCH-frequency-hopping is disabled, as shown in FIG. 6A, the UE may use an SF without intra-slot hopping.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

Also, the UE may perform base sequence hopping on a slot level. In other words, the UE may change the base sequence between slots. Also, regardless of whether PUCCH-frequency-hopping is enabled or disabled, the UE uses one base sequence in one slot. In other words, the UE does not have to change the base sequence hopping within a slot.

When PUCCH-starting-PRB is equal to PUCCH-2nd-hop-PRB, and PUCCH-frequency-hopping is disabled, intra-slot frequency hopping is not applied to the UE, and the UE may perform repetitions of transmitting the PUCCH in one slot where base sequence hopping on a slot level is applied (in the event PF 1 is used, an SF without intra-slot hopping is additionally applied), over $N_{PUCCH}^{repeat}$ slots. In this example, $N_{PUCCH}^{repeat}=4$ holds.

Figure 6B:
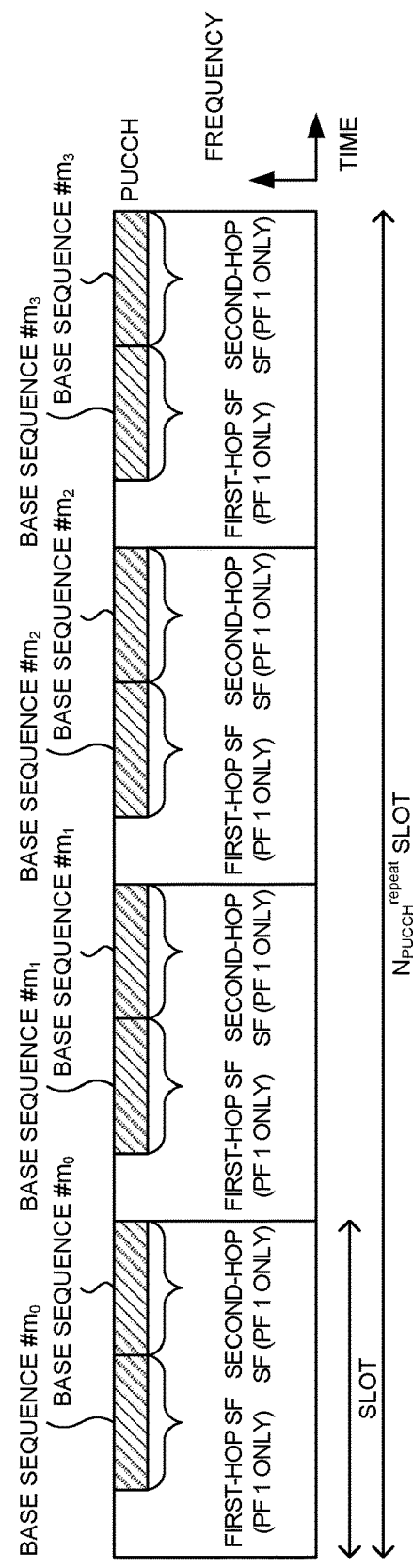

If PUCCH-starting-PRB is equal to PUCCH-2nd-hop-PRB and PUCCH-frequency-hopping is enabled, as shown in FIG. 6B, the UE may use SFs with intra-slot hopping. In this case, the UE may use the first-hop SF before the frequency hopping timing, and use the second-hop SF after the frequency hopping timing. Here, the above frequency hopping timing may be the same as the frequency hopping timing for when PUCCH-starting-PRB is different from PUCCH-2nd-hop-PRB and PUCCH-frequency-hopping is enabled. For example, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2).

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

If PUCCH-starting-PRB is equal to PUCCH-2nd-hop-PRB and PUCCH-frequency-hopping is enabled, intra-slot frequency hopping is not applied to the UE, and the UE may perform repetitions of transmitting the PUCCH in one slot where base sequence hopping on a slot level is applied (in the event PF 1 is used, SFs with intra-slot hopping are additionally applied), over $N_{PUCCH}^{repeat}$ slots. In this example, $N_{PUCCH}^{repeat}=4$ holds.

According to an example 3-1, the NW can change the SF (OCC length), flexibly, depending on whether PUCCH-frequency-hopping is enabled or disabled.

Example 3-2

A case will be described, with an example 3-2, in which base sequence hopping on a frequency-hop level is applied.

Note that even if UE does not actually perform frequency hopping for the PUCCH, the UE may perform base sequence hopping at the timing of frequency hopping.

Figure 7A:
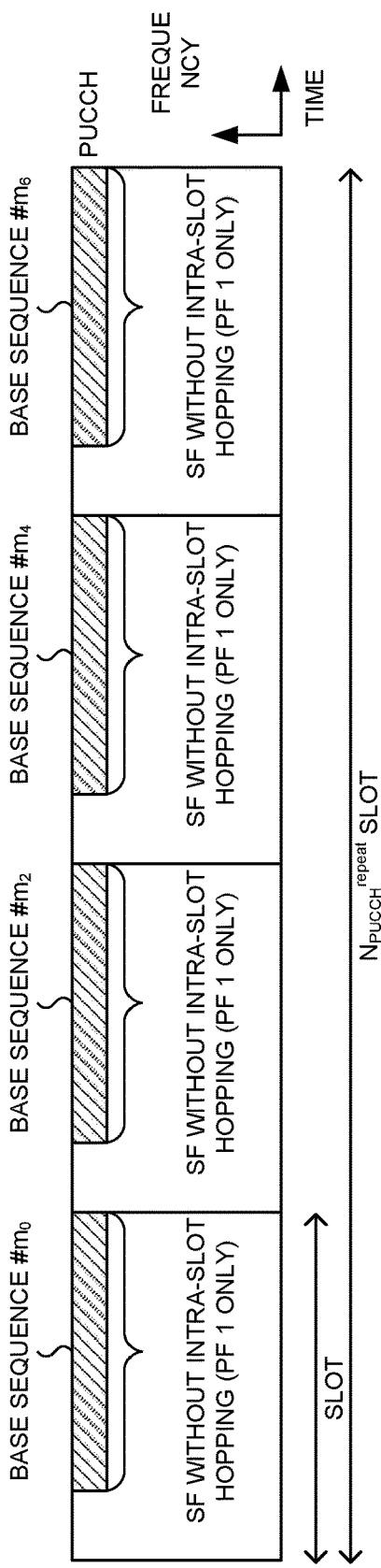
FIGS. 7A and 7B are diagrams to show examples of the method of determining a base sequence and SF according to an example 3-2 of the present invention.

If PUCCH-starting-PRB is equal to PUCCH-2nd-hop-PRB and PUCCH-frequency-hopping is disabled, as shown in FIG. 7A, the UE may use an SF without intra-slot hopping.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

Also, the UE does not perform frequency hopping when PUCCH-frequency-hopping is disabled, and it naturally follows that the UE does not have to perform base sequence hopping on a frequency-hop level either. Consequently, the UE may use one base sequence in one slot. In other words, the UE does not have to change the base sequence hopping within a slot. On the other hand, the UE may perform base sequence hopping between slots. In other words, the UE may change the base sequence between slots.

When PUCCH-starting-PRB is equal to PUCCH-2nd-hop-PRB, and PUCCH-frequency-hopping is disabled, intra-slot frequency hopping is not applied to the UE, and the UE may perform repetitions of transmitting the PUCCH in one slot where base sequence hopping on a slot level is applied (in the event PF 1 is used, an SF without intra-slot hopping is additionally applied), over $N_{PUCCH}^{repeat}$ slots. In this example, $N_{PUCCH}^{repeat}=4$ holds.

Figure 7B:
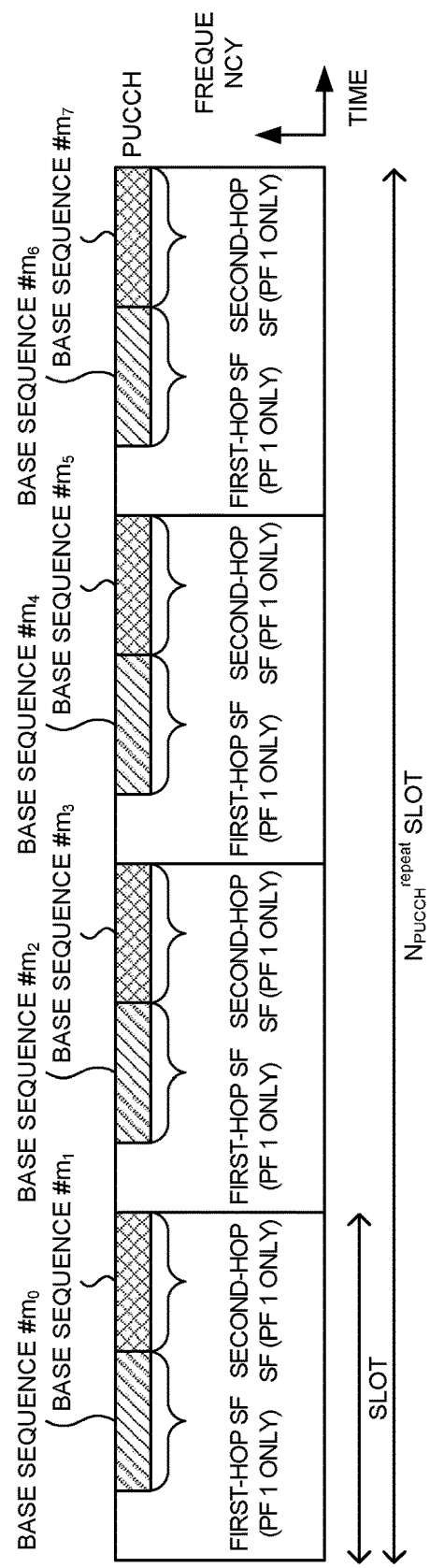

If PUCCH-starting-PRB is equal to PUCCH-2nd-hop-PRB and PUCCH-frequency-hopping is enabled, as shown in FIG. 7B, the UE may use SFs with intra-slot hopping. In this case, the UE may use the first-hop SF before the frequency hopping timing, and use the second-hop SF after the frequency hopping timing.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

Also, when PUCCH-frequency-hopping is enabled, the UE may perform base sequence hopping (switch the base sequence), at the timing of frequency hopping, for at least one of PUCCH formats 0 to 4. In this case, the UE may change the base sequence before and after the frequency hopping timing. Additionally, the UE may perform base sequence hopping between slots.

By changing the base sequence within a slot, a number of UEs are more likely to use different base sequences, for example, at least either before or after frequency hopping (base sequence hopping). Therefore, the possibility that base sequences collide with each other decreases, and the robustness to inter-cell interference increases.

If PUCCH-starting-PRB is equal to PUCCH-2nd-hop-PRB and PUCCH-frequency-hopping is enabled, intra-slot frequency hopping is not applied to the UE, and the UE may perform repetitions of transmitting the PUCCH in one slot where base sequence hopping on a frequency-hop level is applied (in the event PF 1 is used, SFs with intra-slot hopping are additionally applied), over $N_{PUCCH}^{repeat}$ slots. In this example, $N_{PUCCH}^{repeat}=4$ holds.

According to the third example, the NW can change the SF, flexibly, based on the configuration of frequency hopping. Also, the UE can properly control base sequence hopping based on the configuration of frequency hopping.

Also, since it is preferable to use the same base sequence within one time-domain OCC, base sequence hopping on a slot level or a frequency-hop level is applied. Meanwhile, changing the cyclic shift within one time-domain OCC has no impact on the orthogonality of time-domain OCCs, so that hopping in units of symbols (or on a symbol level) may be applied to the cyclic shift, or hopping on a slot level or cyclic shift hopping on a frequency-hop level may be applied, as with base sequences.

Fourth Example

With a fourth example of the present invention, a method of reducing higher layer parameters for frequency hopping, in at least one of PUCCH formats 0 to 4 when PUCCH transmission over a number of slots is configured, will be described below.

Assume that the UE is configured with $N_{PUCCH}^{repeat}$, which is the number of PUCCH slots, greater than one, via higher layer signaling (for example, PUCCH-F1-number-of-slots, PUCCH-F3-number-of-slots, or PUCCH-F4-number-of-slots).

The UE may determine whether frequency hopping for the PUCCH is enabled or not, based on PUCCH-starting-PRB and PUCCH-2nd-hop-PRB, among the PUCCH resources configured. In other words, PUCCH-frequency-hopping needs not be reported to the UE.

When the UE is configured with PUCCH-starting-PRB and PUCCH-2nd-hop-PRB that are mutually equal, as shown in FIG. 8A, the UE may assume that PUCCH-frequency-hopping is disabled. In this case, the UE may perform repetitions of transmitting the PUCCH in one slot where intra-slot frequency hopping is not applied, over $N_{PUCCH}^{repeat}$ slots. In this example, $N_{PUCCH}^{repeat}=4$ holds.

For example, the UE may determine at least one of the SF, the DMRS configuration and the base sequence when PUCCH-frequency-hopping is disabled, in accordance with at least one of the first example, the second example and the third example.

When the UE is configured with PUCCH-starting-PRB and PUCCH-2nd-hop-PRB that are mutually different, as shown in FIG. 8B, the UE may assume that PUCCH-frequency-hopping is enabled. In this case, the UE may perform repetitions of transmitting the PUCCH in one slot where intra-slot frequency hopping is applied, over $N_{PUCCH}^{repeat}$ slots. In this example, $N_{PUCCH}^{repeat}=4$ holds.

For example, the UE may determine at least one of the SF, the DMRS configuration and the base sequence when PUCCH-frequency-hopping is enabled, in accordance with at least one of the first example, the second example, and the third example.

According to the fourth example, the NW does not report the higher layer parameter (for example, PUCCH-frequency-hopping) that indicates whether PUCCH frequency hopping is enabled or disabled, to the UE, so that it is possible to reduce the higher layer parameters and simplify the UE operations.

Fifth Example

With a fifth example of the present invention, a method, by which UE determines the SF (OCC length) for PUCCH format 1 based on PUCCH-starting-PRB and PUCCH-2nd-hop-PRB, when the UE is configured at least with PUCCH-starting-PRB and PUCCH-2nd-hop-PRB (or two parameters equivalent to these), and PUCCH transmission over a number of slots is configured, will be described.

Assume that the UE is configured with $N_{PUCCH}^{repeat}$, which is the number of PUCCH slots, greater than one, via higher layer signaling (for example, PUCCH-F1-number-of-slots).

When the UE is configured with PUCCH-starting-PRB and PUCCH-2nd-hop-PRB that are mutually equal, as shown in FIG. 9A, the UE may use an SF without intra-slot hopping, regardless of whether PUCCH-frequency-hopping is enabled or disabled. In this case, intra-slot frequency hopping is not applied to the UE, and the UE may perform repetitions of transmitting the PUCCH in one slot where an SF without intra-slot hopping is applied, over $N_{PUCCH}^{repeat}$ slots. In this example, $N_{PUCCH}^{repeat}=4$ holds.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

When the UE is configured with PUCCH-starting-PRB and PUCCH-2nd-hop-PRB that are mutually different, as shown in FIG. 9B, the UE may use SFs with intra-slot hopping. In this case, the UE may use the first-hop SF before the frequency hopping timing, and use the second-hop SF after the frequency hopping timing. In this case, the UE may perform repetitions of transmitting the PUCCH in one slot where intra-slot frequency hopping and SFs with intra-slot hopping are applied, over $N_{PUCCH}^{repeat}$ slots. In this example, $N_{PUCCH}^{repeat}=4$ holds.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

The UE performs frequency hopping for the PUCCH in the slot, so that a frequency diversity gain can be achieved.

When the UE is configured with PUCCH-starting-PRB and PUCCH-2nd-hop-PRB that are mutually different, the UE may assume that PUCCH-frequency-hopping is not configured disabled (that is, configured enabled). Also, when the UE is configured with PUCCH-starting-PRB and PUCCH-2nd-hop-PRB that are mutually different, the UE may use SFs with intra-slot hopping, regardless of whether PUCCH-frequency-hopping is enabled or disabled.

The UE may carry out UE operations so that the UE uses an SF without intra-slot hopping when PUCCH-frequency-hopping is configured disabled and PUCCH-starting-PRB and PUCCH-2nd-hop-PRB that are mutually equal are configured, and the UE uses SFs with intra-slot hopping when PUCCH-frequency-hopping is configured enabled and PUCCH-starting-PRB and PUCCH-2nd-hop-PRB that are mutually different are configured. When PUCCH-frequency-hopping is configured disabled and PUCCH-starting-PRB and PUCCH-2nd-hop-PRB that are mutually different are configured, the UE to carry out the above UE operations may assume that this configuration is not valid (the UE may assume that this combination is not to be configured). When PUCCH-frequency-hopping is configured enabled and PUCCH-starting-PRB and PUCCH-2nd-hop-PRB that are mutually equal are configured, the UE to carry out the above UE operations may assume that this configuration is not valid (the UE may assume that this combination is not to be configured).

According to the fifth example, the NW can change the SF, flexibly, based on the configuration of frequency hopping.

The NW needs not to report the higher layer parameter to indicate whether frequency hopping for the PUCCH is enabled or disabled (for example, PUCCH-frequency-hopping), to the UE. In this case, it is possible to reduce the higher layer parameters, and simplify the UE operations.

Sixth Example

With a sixth example of the present invention, a method, by which UE determines the DMRS configurations for PUCCH format 3 and/or 4 based on PUCCH-starting-PRB and PUCCH-2nd-hop-PRB, when the UE is configured at least with PUCCH-starting-PRB and PUCCH-2nd-hop-PRB (or two parameters equivalent to these) and PUCCH transmission over a number of slots is configured, will be described.

Assume that the UE is configured with $N_{PUCCH}^{repeat}$, which is the number of PUCCH slots, greater than one, via higher layer signaling (for example, PUCCH-F3-number-of-slots or PUCCH-F4-number-of-slots).

Similar to the case of SFs, for the DMRS configurations for PUCCH format 3 and/or 4, DMRS configurations without intra-slot hopping (that is, with no intra-slot hopping) and DMRS configurations with intra-slot hopping may be defined in the specification. A DMRS configuration with intra-slot hopping may include a DMRS configuration for the first hop and a DMRS configuration for the second hop.

The UE may determine the DMRS configuration based on PUCCH-starting-PRB and PUCCH-2nd-hop-PRB, among the PUCCH resources configured.

Figure 10A:
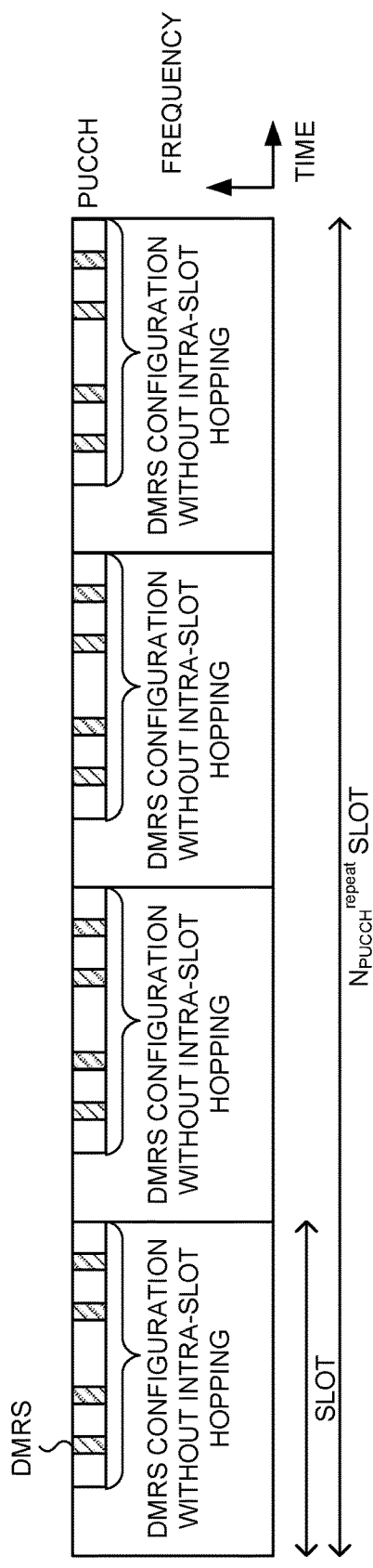
FIGS. 10A and 10B are diagrams to show examples of the method of determining DMRS configuration according to a sixth example of the present invention.

When the UE is configured with PUCCH-starting-PRB and PUCCH-2nd-hop-PRB that are mutually equal, as shown in FIG. 10A, the UE may use a DMRS configuration without intra-slot hopping, regardless of whether PUCCH-frequency-hopping is enabled or disabled. In this case, intra-slot frequency hopping is not applied to the UE, and the UE may perform repetitions of transmitting the PUCCH in one slot where a DMRS configuration without intra-slot hopping is applied, over $N_{PUCCH}^{repeat}$ slots. In this example, $N_{PUCCH}^{repeat}=4$ holds.

Figure 10B:
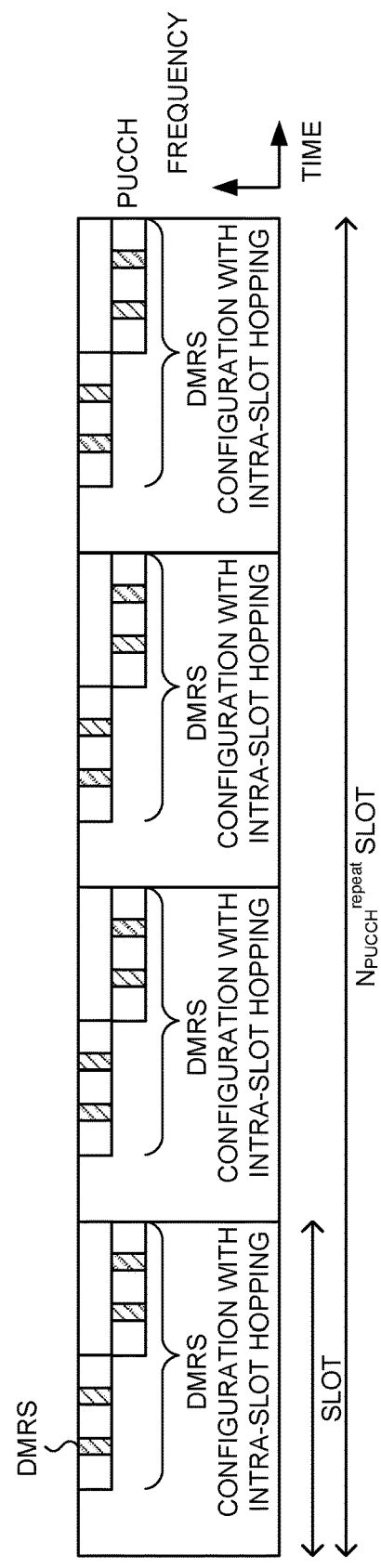

When the UE is configured with PUCCH-starting-PRB and PUCCH-2nd-hop-PRB that are mutually different, as shown in FIG. 10B, the UE may use a DMRS configuration with intra-slot hopping. In this case, the UE may use the first-hop DMRS configuration before the frequency hopping timing, and use the second-hop DMRS configuration after the frequency hopping timing. Here, as for the timing for frequency hopping, which has been described above, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, the UE may perform repetitions of transmitting the PUCCH in one slot where intra-slot frequency hopping and a DMRS configuration with intra-slot hopping are applied, over $N_{PUCCH}^{repeat}$ slots. In this example, $N_{PUCCH}^{repeat}=4$ holds.

When the UE is configured with PUCCH-starting-PRB and PUCCH-2nd-hop-PRB that are mutually different, the UE may assume that PUCCH-frequency-hopping is not configured disabled (that is, configured enabled). Also, when the UE is configured with PUCCH-starting-PRB and PUCCH-2nd-hop-PRB that are mutually different, the UE may use a DMRS configuration with intra-slot hopping, regardless of whether PUCCH-frequency-hopping is enabled or disabled.

The UE may carry out UE operations so that the UE uses a DMRS configuration without intra-slot hopping when PUCCH-frequency-hopping is configured disabled and PUCCH-starting-PRB and PUCCH-2nd-hop-PRB that are mutually equal are configured, and the UE uses a DMRS configuration with intra-slot hopping when PUCCH-frequency-hopping is configured enabled and PUCCH-starting-PRB and PUCCH-2nd-hop-PRB that are mutually different are configured. When PUCCH-frequency-hopping is configured disabled and PUCCH-starting-PRB and PUCCH-2nd-hop-PRB that are mutually different are configured, the UE to carry out the above UE operations may assume that this configuration is not valid (the UE may assume that this combination is not to be configured). When PUCCH-frequency-hopping is configured enabled and PUCCH-starting-PRB and PUCCH-2nd-hop-PRB that are mutually equal are configured, the UE to carry out the above UE operations may assume that this configuration is not valid (the UE may assume that this combination is not to be configured).

Note that the locations of the DMRS where frequency hopping is not applied may be the same as the locations of the DMRS where frequency hopping is applied.

According to the sixth example, the NW can flexibly change the DMRS configuration based on the configuration of frequency hopping.

The NW needs not to report the higher layer parameter to indicate whether frequency hopping for the PUCCH is enabled or disabled (for example, PUCCH-frequency-hopping), to the UE. In this case, it is possible to reduce the higher layer parameters, and simplify the UE operations.

Seventh Example

With a seventh example of the present invention, a method, by which UE determines the base sequence for at least one of PUCCH formats 0 to 4 (in particular, PUCCH formats 1, 3, and 4) and/or the SF for PUCCH format 1, based on PUCCH-starting-PRB and PUCCH-2nd-hop-PRB, when the UE is configured at least with PUCCH-starting-PRB and PUCCH-2nd-hop-PRB (or two parameters equivalent to these) and PUCCH transmission over a number of slots is configured, will be described.

Assume that the UE is configured with $N_{PUCCH}^{repeat}$, which is the number of PUCCH slots, greater than one, via higher layer signaling (for example, PUCCH-F1-number-of-slots, PUCCH-F3-number-of-slots, or PUCCH-F4-number-of-slots).

The UE may determine the base sequence and/or the SF based on PUCCH-starting-PRB and PUCCH-2nd-hop-PRB, among the PUCCH resources configured.

Example 7-1

A case will be described, with example 7-1, in which base sequence hopping on a slot level is applied.

Figure 11A:
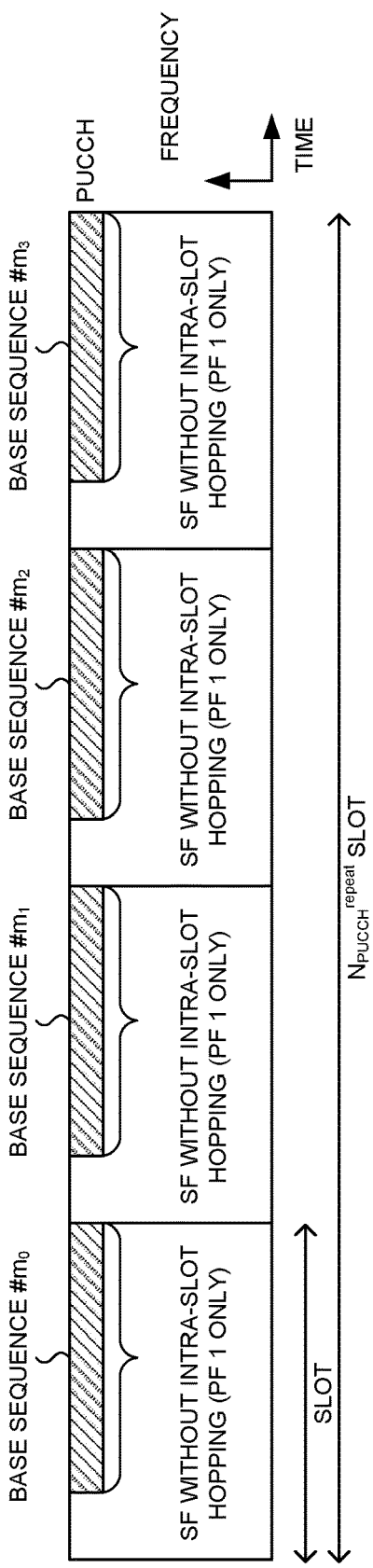
FIGS. 11A and 11B are diagrams to show examples of the method of determining a base sequence and SF according to an example 7-1 of the present invention.

When the UE is configured with PUCCH-starting-PRB and PUCCH-2nd-hop-PRB that are mutually equal, as shown in FIG. 11A, the UE may use an SF without intra-slot hopping, regardless of whether PUCCH-frequency-hopping is enabled or disabled.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

Also, the UE may perform base sequence hopping on a slot level. In other words, the UE may change the base sequence between slots. The UE may use one base sequence, in one slot, regardless of whether PUCCH-starting-PRB and PUCCH-2nd-hop-PRB are equal or not. In other words, the UE does not have to change the base sequence hopping within a slot. In this case, intra-slot frequency hopping is not applied to the UE, and the UE may perform repetitions of transmitting the PUCCH in one slot where an SF without intra-slot hopping and base sequence hopping on a slot level are applied, over $N_{PUCCH}^{repeat}$ slots. In this example, $N_{PUCCH}^{repeat}=4$ holds.

Figure 11B:
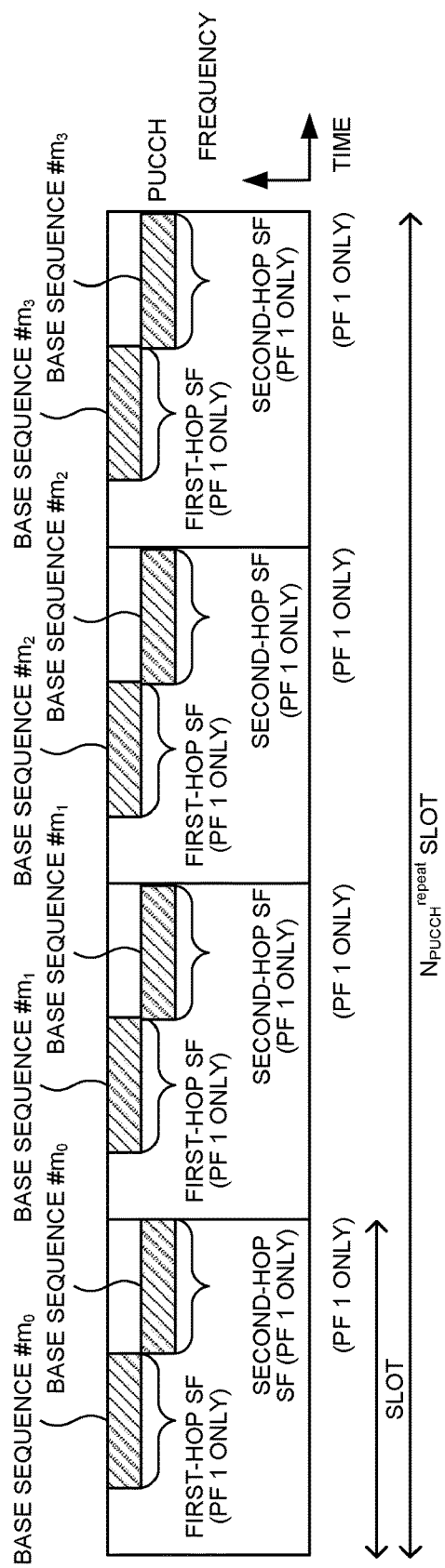

When the UE is configured with PUCCH-starting-PRB and PUCCH-2nd-hop-PRB that are mutually different, as shown in FIG. 11B, the UE may use SFs with intra-slot hopping. In this case, the UE may use the first-hop SF before the frequency hopping timing, and use the second-hop SF after the frequency hopping timing. Here, as for the timing for frequency hopping, which has been described above, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, the UE may perform repetitions of transmitting the PUCCH in one slot where intra-slot frequency hopping, SFs with intra-slot hopping and base sequence hopping on a slot level are applied, over $N_{PUCCH}^{repeat}$ slots. In this example, $N_{PUCCH}^{repeat}=4$ holds.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

When the UE is configured with PUCCH-starting-PRB and PUCCH-2nd-hop-PRB that are mutually different, the UE may assume that PUCCH-frequency-hopping is not configured disabled (that is, configured enabled). Also, when the UE is configured with PUCCH-starting-PRB and PUCCH-2nd-hop-PRB that are mutually different, the UE may use SFs with intra-slot hopping, regardless of whether PUCCH-frequency-hopping is enabled or disabled.

The UE may carry out UE operations so that the UE uses an SF without intra-slot hopping when PUCCH-frequency-hopping is configured disabled and PUCCH-starting-PRB and PUCCH-2nd-hop-PRB that are mutually equal are configured, and the UE uses SFs with intra-slot hopping when PUCCH-frequency-hopping is configured enabled and PUCCH-starting-PRB and PUCCH-2nd-hop-PRB that are mutually different are configured. When PUCCH-frequency-hopping is configured disabled and PUCCH-starting-PRB and PUCCH-2nd-hop-PRB that are mutually different are configured, the UE to carry out the above UE operations may assume that this configuration is not valid (the UE may assume that this combination is not to be configured). When PUCCH-frequency-hopping is configured enabled and PUCCH-starting-PRB and PUCCH-2nd-hop-PRB that are mutually equal are configured, the UE to carry out the above UE operations may assume that this configuration is not valid (the UE may assume that this combination is not to be configured).

According to an example 7-1, the NW can change the SF (OCC length), flexibly, depending on whether PUCCH-starting-PRB and PUCCH-2nd-hop-PRB are equal or not.

Example 7-2

A case will be described, with an example 7-2, in which base sequence hopping on a frequency-hop level is applied.

Figure 12A:
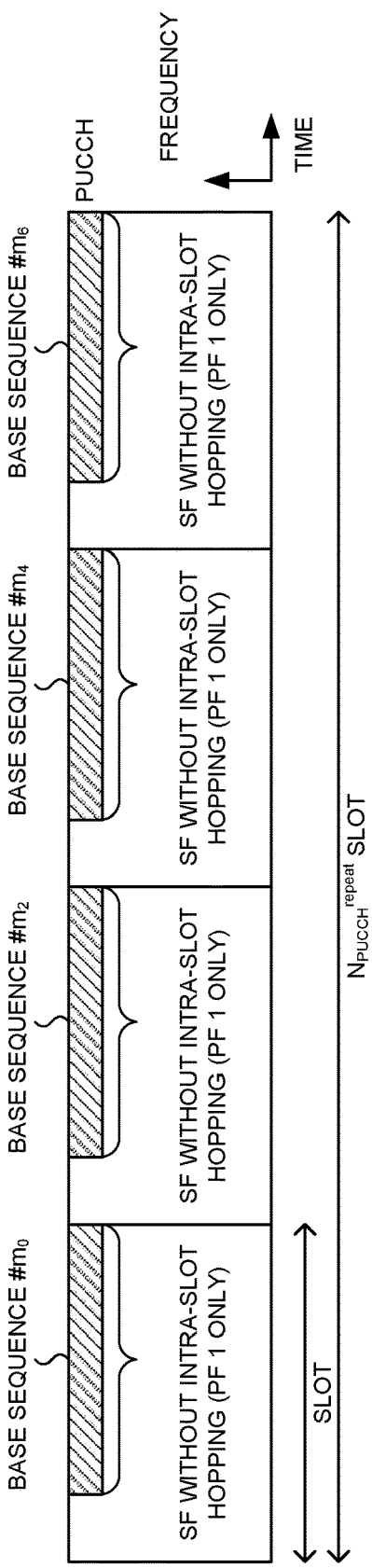
FIGS. 12A and 12B are diagrams to show examples of the method of determining a base sequence and SF according to an example 7-2 of the present invention.

When the UE is configured with PUCCH-starting-PRB and PUCCH-2nd-hop-PRB that are mutually equal, as shown in FIG. 12A, the UE may use an SF without intra-slot hopping, regardless of whether PUCCH-frequency-hopping is enabled or disabled.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

Also, the UE does not perform frequency hopping when the UE is configured with PUCCH-starting-PRB and PUCCH-2nd-hop-PRB that are mutually equal, and it naturally follows that the UE does not have to perform base sequence hopping on a frequency-hop level either. Consequently, the UE may use one base sequence in one slot. In other words, the UE does not have to change the base sequence hopping within a slot. On the other hand, the UE may perform base sequence hopping between slots. In other words, the UE may change the base sequence between slots. In this case, intra-slot frequency hopping is not applied to the UE, and the UE may perform repetitions of transmitting the PUCCH in one slot where an SF without intra-slot hopping and base sequence hopping on a slot level are applied, over $N_{PUCCH}^{repeat}$ slots. In this example, $N_{PUCCH}^{repeat}=4$ holds.

Figure 12B:
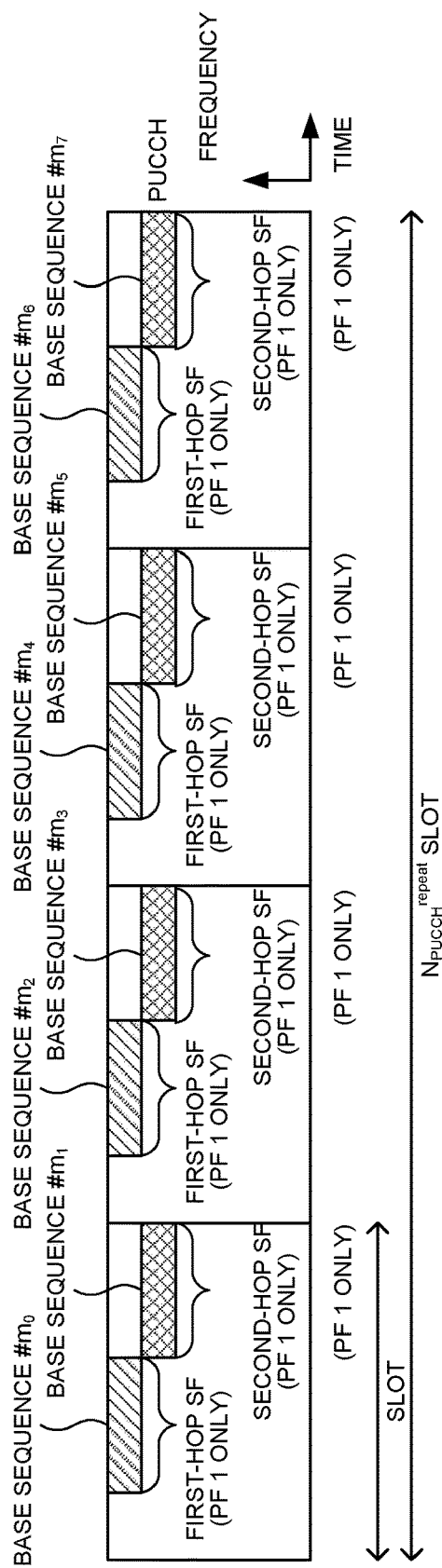

When the UE is configured with PUCCH-starting-PRB and PUCCH-2nd-hop-PRB that are mutually different, as shown in FIG. 12B, the UE may use SFs with intra-slot hopping. In this case, the UE may use the first-hop SF before the frequency hopping timing, and use the second-hop SF after the frequency hopping timing.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

Also, the UE performs frequency hopping when the UE is configured with PUCCH-starting-PRB and PUCCH-2nd-hop-PRB that are mutually different, so that the UE may perform base sequence hopping (switch the base sequence), at the timing of frequency hopping, for at least one of PUCCH formats 0 to 4. In this case, the UE may change the base sequence before and after the frequency hopping timing. On the other hand, the UE may perform base sequence hopping between slots. In this case, the UE may perform repetitions of transmitting the PUCCH in one slot where intra-slot frequency hopping, SFs with intra-slot hopping and base sequence hopping on a frequency-hop level are applied, over $N_{PUCCH}^{repeat}$ slots. In this example, $N_{PUCCH}^{repeat}=4$ holds.

By changing the base sequence within a slot, a number of UEs are more likely to use different base sequences, for example, at least either before or after frequency hopping (base sequence hopping). Therefore, the possibility that base sequences collide with each other decreases, and the robustness to inter-cell interference increases.

When the UE is configured with PUCCH-starting-PRB and PUCCH-2nd-hop-PRB that are mutually different, the UE may assume that PUCCH-frequency-hopping is not configured disabled (that is, configured enabled). Also, when the UE is configured with PUCCH-starting-PRB and PUCCH-2nd-hop-PRB that are mutually different, the UE may use SFs with intra-slot hopping, regardless of whether PUCCH-frequency-hopping is enabled or disabled.

The UE may carry out UE operations so that the UE uses an SF without intra-slot hopping when PUCCH-frequency-hopping is configured disabled and PUCCH-starting-PRB and PUCCH-2nd-hop-PRB that are mutually equal are configured, and the UE uses SFs with intra-slot hopping when PUCCH-frequency-hopping is configured enabled and PUCCH-starting-PRB and PUCCH-2nd-hop-PRB that are mutually different are configured. When PUCCH-frequency-hopping is configured disabled and PUCCH-starting-PRB and PUCCH-2nd-hop-PRB that are mutually different are configured, the UE to carry out the above UE operations may assume that this configuration is not valid (the UE may assume that this combination is not to be configured). When PUCCH-frequency-hopping is configured enabled and PUCCH-starting-PRB and PUCCH-2nd-hop-PRB that are mutually equal are configured, the UE to carry out the above UE operations may assume that this configuration is not valid (the UE may assume that this combination is not to be configured).

According to the seventh example, the NW can change the SF, flexibly, based on the configuration of frequency hopping. Also, the UE can properly control base sequence hopping based on the configuration of frequency hopping.

Also, since it is preferable to use the same base sequence within one time-domain OCC, base sequence hopping on a slot level or a frequency-hop level is applied. Meanwhile, changing the cyclic shift within one time-domain OCC has no impact on the orthogonality of time-domain OCCs, so that hopping in units of symbols (or on a symbol level) may be applied to the cyclic shift, or hopping on a slot level or cyclic shift hopping on a frequency-hop level may be applied, as with base sequences.

Eighth Example

With an eighth example of the present invention, a method, by which UE determines the SF for PUCCH format 1 when the UE is configured with PUCCH-frequency-hopping (or a parameter equivalent to that) and PUCCH transmission over a number of slots is configured, will be described.

Assume that the UE is configured with $N_{PUCCH}^{repeat}$, which is the number of PUCCH slots, greater than one, via higher layer signaling (for example, PUCCH-F1-number-of-slots).

SFs for PUCCH format 1 are associated with PUCCH lengths, SFs without intra-slot hopping and SFs with intra-slot hopping are associated with PUCCH lengths, and SFs with intra-slot hopping include first-hop SFs and second-hop SFs (see, for example, FIG. 2). Also, time-domain OCC sequences are associated with SFs (see, for example, FIG. 3).

Note that the UE may use SFs with intra-slot hopping even if the UE does not actually perform intra-slot frequency hopping for PUCCH.

The UE may determine the SF based on PUCCH-frequency-hopping, among the PUCCH resources that are configured.

When PUCCH-frequency-hopping is disabled, as shown in FIG. 13A, the UE may use an SF without intra-slot hopping. In this case, intra-slot frequency hopping is not applied to the UE, and the UE may perform repetitions of transmitting the PUCCH in one slot where an SF without intra-slot hopping is applied, over $N_{PUCCH}^{repeat}$ slots. In this example, $N_{PUCCH}^{repeat}=4$ holds.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

When PUCCH-frequency-hopping to indicate disablement is reported via higher layer signaling, the UE may perform one of the following operations 1 and 2.

Operation 1
The UE assumes that the value of PUCCH-starting-PRB reported via higher layer signaling and the value of PUCCH-2nd-hop-PRB reported via higher layer signaling are the same.

Operation 2 The UE assumes that PUCCH-starting-PRB is reported via higher layer signaling, and ignores the value of PUCCH-2nd-hop-PRB, or assumes that the value of PUCCH-2nd-hop-PRB is not valid.

When PUCCH-frequency-hopping is enabled, as shown in FIG. 13B, the UE may use SFs with intra-slot hopping. In this case, the UE may use the first-hop SF before the frequency hopping timing, and use the second-hop SF after the frequency hopping timing. Here, as for the timing for frequency hopping, which has been described above, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, intra-slot frequency hopping is not applied to the UE, and the UE may perform repetitions of transmitting the PUCCH in one slot where SFs with intra-slot hopping are applied, over $N_{PUCCH}^{repeat}$ slots. In this example, $N_{PUCCH}^{repeat}=4$ holds.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

When PUCCH-frequency-hopping to indicate enablement is reported via higher layer signaling, the UE may apply SFs with intra-slot hopping, to the PUCCH, regardless of whether or not PUCCH-2nd-hop-PRB reported via higher layer signaling is the same as PUCCH-starting-PRB reported via higher layer signaling.

According to the eighth example, the NW (network, including, for example, a radio base station, a gNB, etc.) can flexibly change the SF (the OCC length or the OCC multiplexing capacity) based on the configuration of frequency hopping.

Ninth Example

With a ninth example of the present invention, a method, by which UE determines the DMRS configurations for PUCCH format 3 and/or 4 when the UE is configured with PUCCH-frequency-hopping (or a parameter equivalent to that) and PUCCH transmission over a number of slots is configured, will be described. The DMRS configuration may be the locations (for example, the symbols) of the DMRS.

Assume that the UE is configured with $N_{PUCCH}^{repeat}$, which is the number of PUCCH slots, greater than one, via higher layer signaling (for example, PUCCH-F3-number-of-slots or PUCCH-F4-number-of-slots).

Similar to the case of SFs, for the DMRS configurations for PUCCH format 3 and/or 4, DMRS configurations without intra-slot hopping (that is, with no intra-slot hopping) and DMRS configurations with intra-slot hopping may be defined in the specification. A DMRS configuration with intra-slot hopping may include a DMRS configuration for the first hop and a DMRS configuration for the second hop.

The UE may determine the DMRS configuration based on PUCCH-frequency-hopping, among the PUCCH resources configured.

When PUCCH-frequency-hopping is disabled, as shown in FIG. 14A, the UE may use a DMRS configuration without intra-slot hopping. In this case, intra-slot frequency hopping is not applied to the UE, and the UE may perform repetitions of transmitting the PUCCH in one slot where a DMRS configuration without intra-slot hopping is applied, over $N_{PUCCH}^{repeat}$ slots. In this example, $N_{PUCCH}^{repeat}=4$ holds.

When PUCCH-frequency-hopping to indicate disablement is reported via higher layer signaling, the UE may perform one of the following operations 1 and 2.

Operation 1

The UE assumes that the value of PUCCH-starting-PRB reported via higher layer signaling and the value of PUCCH-2nd-hop-PRB reported via higher layer signaling are the same.

Operation 2

The UE assumes that PUCCH-starting-PRB is reported via higher layer signaling, and ignores the value of PUCCH-2nd-hop-PRB, or assumes that the value of PUCCH-2nd-hop-PRB is not valid.

When PUCCH-frequency-hopping is enabled, as shown in FIG. 14B, the UE may use a DMRS configuration with intra-slot hopping. In this case, the UE may use the first-hop DMRS configuration before the frequency hopping timing, and use the second-hop DMRS configuration after the frequency hopping timing. Here, as for the timing for frequency hopping, which has been described above, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2). In this case, intra-slot frequency hopping is not applied to the UE, and the UE may perform repetitions of transmitting the PUCCH in one slot where a DMRS configuration with intra-slot hopping is applied, over $N_{PUCCH}^{repeat}$ slots. In this example, $N_{PUCCH}^{repeat}=4$ holds.

When PUCCH-frequency-hopping to indicate enablement is reported via higher layer signaling, the UE may use a DMRS configuration with intra-slot hopping, regardless of whether or not PUCCH-2nd-hop-PRB reported via higher layer signaling is the same as PUCCH-starting-PRB reported via higher layer signaling.

Note that the locations of the DMRS where frequency hopping is not applied may be the same as the locations of the DMRS where frequency hopping is applied.

According to the ninth example, the NW can flexibly change the DMRS configuration based on the configuration of frequency hopping.

Tenth Example

With a tenth example of the present invention, a method, by which UE determines the base sequence for at least one of PUCCH formats 0 to 4 (in particular, PUCCH formats 1, 3, and 4) and/or the SF for PUCCH format 1, when the UE is configured with PUCCH-frequency-hopping (or a parameter equivalent to that) and PUCCH transmission over a number of slots is configured, will be described. The base sequence may be represented by a base sequence index.

The base sequence may be a CAZAC (Constant Amplitude Zero Auto-Correlation) sequence such as a Zadoff-Chu sequence (for example, a low-PAPR (Peak-to-Average Power Ratio) sequence), may be a sequence defined in the specification (for example, a low-PAPR sequence), or may be a pseudo spreading sequence (for example, a Gold sequence). For example, a PUCCH having a bandwidth of one PRB may use one of a given number of sequences (where the given number may be, for example, 30, 60 or a given value that is determined from the length of the base sequence) defined in the specification, as a base sequence. The base sequence may be used for UCI, or may be used for the DMRS.

Assume that the UE is configured with $N_{PUCCH}^{repeat}$, which is the number of PUCCH slots, greater than one, via higher layer signaling (for example, PUCCH-F1-number-of-slots, PUCCH-F3-number-of-slots, or PUCCH-F4-number-of-slots).

Similar to the eighth example, for SFs for PUCCH format 1, SFs without intra-slot hopping and SFs with intra-slot hopping may be configured in advance, or may be defined in the specification.

The UE may determine the base sequence and/or the SF based on PUCCH-frequency-hopping, among the PUCCH resources configured.

As base sequence hopping, a method of hopping the base sequence per slot (on a slot level) and a method of hopping the base sequence at the timing of frequency hopping (per OCC length) (on a frequency-hop level, a time-domain-OCC level, etc.) may be possible.

Example 10-1

A case will be described here, in which base sequence hopping on a slot level is applied.

When PUCCH-frequency-hopping is disabled, as shown in FIG. 15A, the UE may use an SF without intra-slot hopping.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

When PUCCH-frequency-hopping to indicate disablement is reported via higher layer signaling, the UE may perform one of the following operations 1 and 2.

Operation 1

The UE assumes that the value of PUCCH-starting-PRB reported via higher layer signaling and the value of PUCCH-2nd-hop-PRB reported via higher layer signaling are the same.

Operation 2

The UE assumes that PUCCH-starting-PRB is reported via higher layer signaling, and ignores the value of PUCCH-2nd-hop-PRB, or assumes that the value of PUCCH-2nd-hop-PRB is not valid.

Also, the UE may perform base sequence hopping on a slot level. In other words, the UE may change the base sequence between slots. Also, regardless of whether PUCCH-frequency-hopping is enabled or disabled, the UE may use one base sequence in one slot. In other words, the UE does not have to change the base sequence hopping within a slot.

When PUCCH-frequency-hopping is enabled, as shown in FIG. 15B, the UE may use SFs with intra-slot hopping. In this case, the UE may use the first-hop SF before the frequency hopping timing, and use the second-hop SF after the frequency hopping timing. Here, as for the timing for frequency hopping, which has been described above, the number of symbols of the first hop (the period before the frequency hopping timing in the slot) may be floor(the number of PUCCH symbols/2), and the number of symbols of the second hop (the period after the frequency hopping timing in the slot) may be ceil (the number of PUCCH symbols/2).

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

When PUCCH-frequency-hopping is disabled, intra-slot frequency hopping is not applied to the UE, and the UE may perform repetitions of transmitting the PUCCH in one slot where base sequence hopping on a slot level is applied (in the event PF 1 is used, an SF without intra-slot hopping is additionally applied), over $N_{PUCCH}^{repeat}$ slots. In this example, $N_{PUCCH}^{repeat}=4$ holds.

When PUCCH-frequency-hopping to indicate enablement is reported via higher layer signaling, the UE may apply SFs with intra-slot hopping, to the PUCCH, regardless of whether or not PUCCH-2nd-hop-PRB reported via higher layer signaling is the same as PUCCH-starting-PRB reported via higher layer signaling.

When PUCCH-frequency-hopping is enabled, intra-slot frequency hopping is not applied to the UE, and the UE may perform repetitions of transmitting the PUCCH in one slot where base sequence hopping on a slot level is applied (in the event PF 1 is used, SFs with intra-slot hopping are additionally applied), over $N_{PUCCH}^{repeat}$ slots. In this example, $N_{PUCCH}^{repeat}=4$ holds.

According to this example, the NW can change the SF (OCC length), flexibly, depending on whether PUCCH-frequency-hopping is enabled or disabled.

Example 10-2

A case will be described here, in which base sequence hopping on a frequency-hop level is applied.

Note that even if UE does not actually perform frequency hopping for the PUCCH, the UE may perform base sequence hopping at the timing of frequency hopping.

Figure 16A:
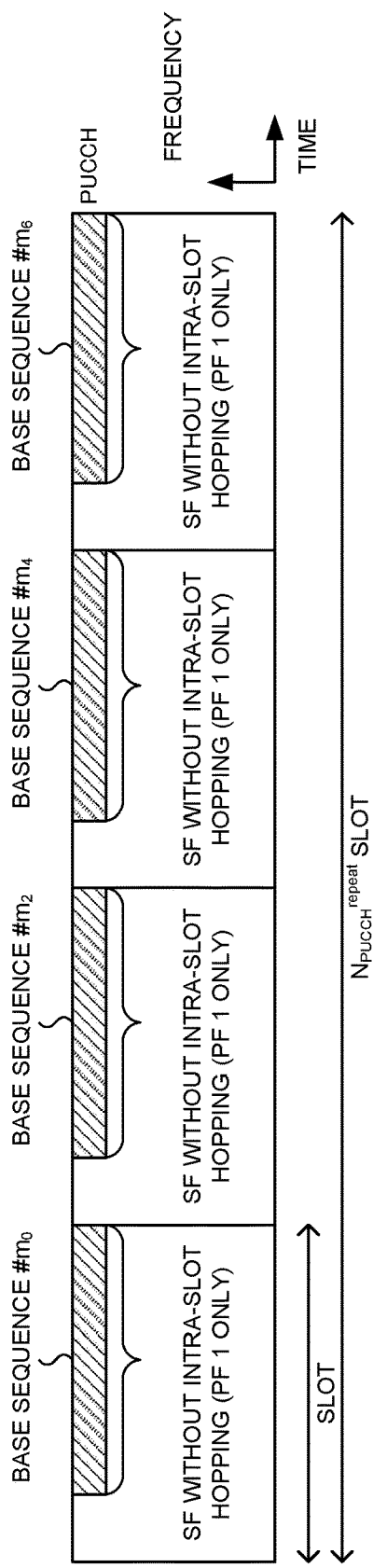
FIGS. 16A and 16B are diagrams to show examples of the method of determining a base sequence and SF according to an example 10-2 of the present invention.

When PUCCH-frequency-hopping is disabled, as shown in FIG. 16A, the UE may use an SF without intra-slot hopping.

An SF without intra-slot hopping is greater than an SF with intra-slot hopping (each of the first-hop SF and the second-hop SF). By using an SF without intra-slot hopping, the OCC length becomes longer (the number of OCCs becomes larger) than when using SFs with intra-slot hopping. Consequently, the OCC multiplexing capacity (the maximum number of UEs to multiplex) can be increased.

When PUCCH-frequency-hopping to indicate disablement is reported via higher layer signaling, the UE may perform one of the following operations 1 and 2.

Operation 1

The UE assumes that the value of PUCCH-starting-PRB reported via higher layer signaling and the value of PUCCH-2nd-hop-PRB reported via higher layer signaling are the same.

Operation 2

The UE assumes that PUCCH-starting-PRB is reported via higher layer signaling, and ignores the value of PUCCH-2nd-hop-PRB, or assumes that the value of PUCCH-2nd-hop-PRB is not valid.

Also, the UE does not perform frequency hopping when PUCCH-frequency-hopping is disabled, and it naturally follows that the UE does not have to perform base sequence hopping on a frequency-hop level either. Consequently, the UE may use one base sequence in one slot. In other words, the UE does not have to change the base sequence hopping within a slot. On the other hand, the UE may perform base sequence hopping between slots. In other words, the UE may change the base sequence between slots.

When PUCCH-frequency-hopping is disabled, intra-slot frequency hopping is not applied to the UE, and the UE may perform repetitions of transmitting the PUCCH in one slot where base sequence hopping on a slot level is applied (in the event PF 1 is used, an SF without intra-slot hopping is additionally applied), over $N_{PUCCH}^{repeat}$ slots. In this example, $N_{PUCCH}^{repeat}=4$ holds.

Figure 16B:
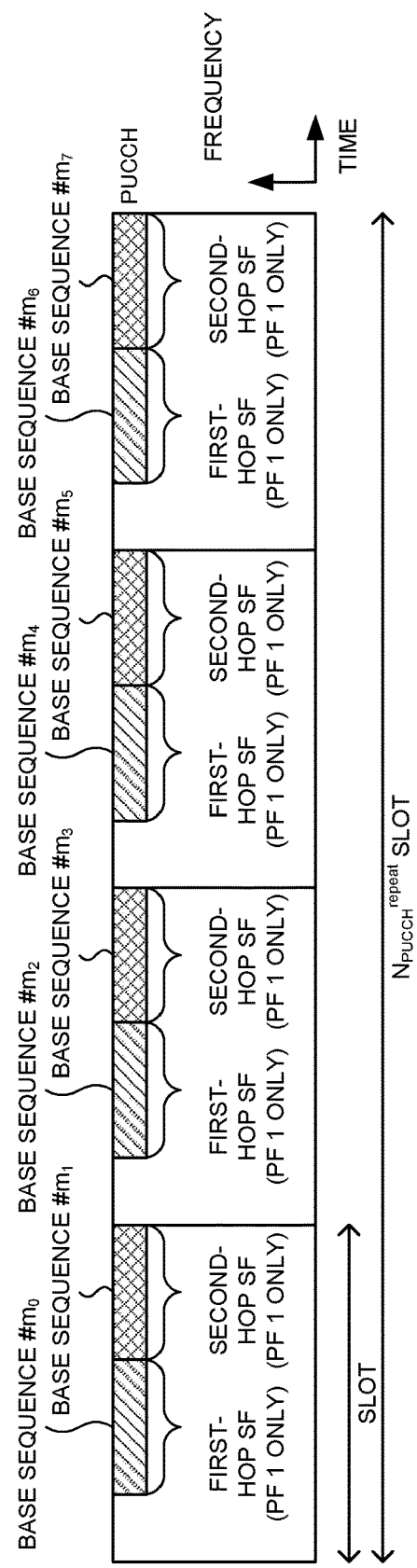

When PUCCH-frequency-hopping is enabled, as shown in FIG. 16B, the UE may use SFs with intra-slot hopping. In this case, the UE may use the first-hop SF before the frequency hopping timing, and use the second-hop SF after the frequency hopping timing.

An SF with intra-slot hopping (each of the first-hop SF and the second-hop SF) is smaller than an SF without intra-slot hopping. By using SFs with intra-slot hopping, the OCC length becomes shorter than when using an SF without intra-slot hopping. Consequently, when the UE moves at high speed, the signal in a time-domain OCC varies less, and the orthogonality of the time-domain OCC is less likely to deteriorate, so that the robustness against high-speed movement of the UE increases.

When PUCCH-frequency-hopping to indicate enablement is reported via higher layer signaling, the UE may apply SFs with intra-slot hopping, to the PUCCH, regardless of whether or not PUCCH-2nd-hop-PRB reported via higher layer signaling is the same as PUCCH-starting-PRB reported via higher layer signaling.

Also, when PUCCH-frequency-hopping is enabled, the UE may perform base sequence hopping (switch the base sequence), at the timing of frequency hopping, for at least one of PUCCH formats 0 to 4. In this case, the UE may change the base sequence before and after the frequency hopping timing. Additionally, the UE may perform base sequence hopping between slots.

By changing the base sequence within a slot, a number of UEs are more likely to use different base sequences, for example, at least either before or after frequency hopping (base sequence hopping). Therefore, the possibility that base sequences collide with each other decreases, and the robustness to inter-cell interference increases.

If PUCCH-starting-PRB is equal to PUCCH-2nd-hop-PRB and PUCCH-frequency-hopping is enabled, intra-slot frequency hopping is not applied to the UE, and the UE may perform repetitions of transmitting the PUCCH in one slot where base sequence hopping on a frequency-hop level is applied (in the event PF 1 is used, SFs with intra-slot hopping are additionally applied), over $N_{PUCCH}^{repeat}$ slots. In this example, $N_{PUCCH}^{repeat}=4$ holds.

When PUCCH-frequency-hopping to indicate enablement is reported via higher layer signaling, the UE may perform base sequence hopping at the timing of frequency hopping, regardless of whether or not PUCCH-2nd-hop-PRB reported via higher layer signaling is the same as PUCCH-starting-PRB reported via higher layer signaling.

According to the tenth example, the NW can change the SF, flexibly, based on the configuration of frequency hopping. Also, the UE can properly control base sequence hopping based on the configuration of frequency hopping.

Also, since it is preferable to use the same base sequence within one time-domain OCC, base sequence hopping on a slot level or a frequency-hop level is applied. Meanwhile, changing the cyclic shift within one time-domain OCC has no impact on the orthogonality of time-domain OCCs, so that hopping in units of symbols (or on a symbol level) may be applied to the cyclic shift, or hopping on a slot level or cyclic shift hopping on a frequency-hop level may be applied, as with base sequences.

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 17:
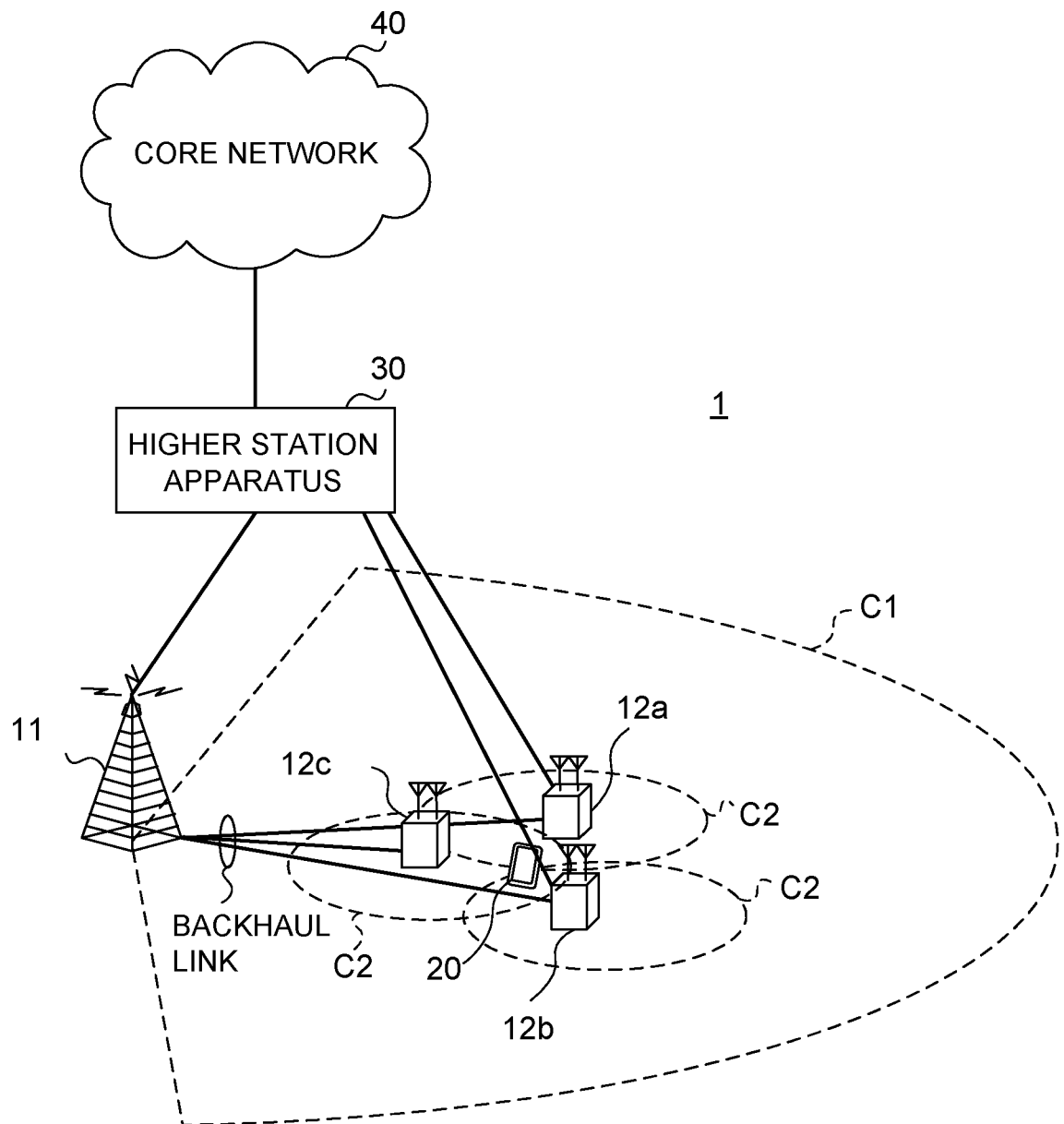
FIG. 17 is a diagram to show an exemplary schematic structure of a radio communication system according to the present embodiment.

FIG. 17 is a diagram to show an exemplary schematic structure of a radio communication system according to one embodiment of the present invention. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and the number of cells and user terminals 20 and so forth are not limited to those illustrated in the drawings.

The user terminals 20 can connect with both the radio base station 11 and the radio base stations 12. The user terminals 20 are expected to use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

The radio base station 11 and a radio base station 12 (or two radio base stations 12) may be connected with each other by cables (for example, by optical fiber in compliance with the CPRI (Common Public Radio Interface), the X2 interface, and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a number of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACKs/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

<Radio Base Station>

Figure 18:
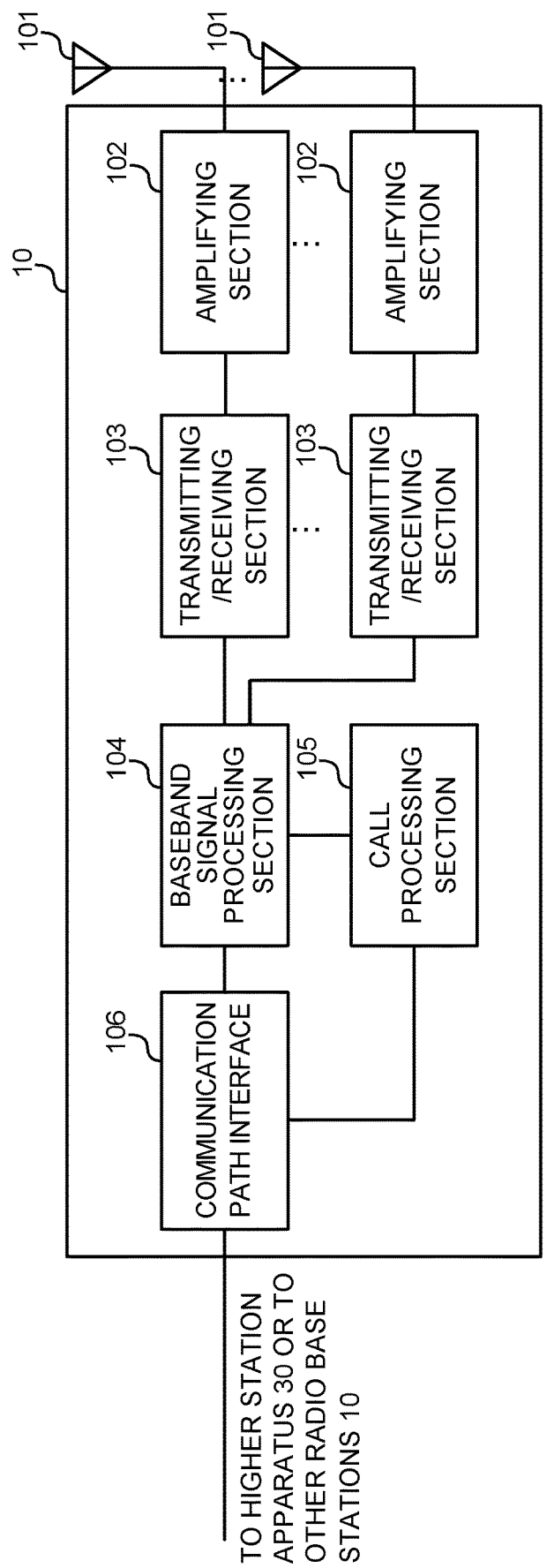
FIG. 18 is a diagram to show an exemplary overall structure of a radio base station according to the present embodiment.

FIG. 18 is a diagram to show an exemplary overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may transmit first frequency resource information (for example, PUCCH-starting-PRB), which indicates the first frequency resource at the start of an uplink control channel (PUCCH), and second frequency resource information (for example, PUCCH-2nd-hop-PRB), which indicates a second frequency resource after the frequency hopping timing of the uplink control channel, to the user terminal 20. Furthermore, the transmitting/receiving sections 103 may transmit frequency hopping information (PUCCH-frequency-hopping), which indicates whether frequency hopping for the uplink control channel in one slot is enabled or not, and information that indicates the number of slots for the uplink control channel (for example, the number of PUCCH slots, the number of PUCCH repetitions, etc.) (for example, PUCCH-F1-number-of-slots, PUCCH-F3-number-of-slots, or PUCCH-F4-number-of-slots), to the user terminal 20.

Figure 19:
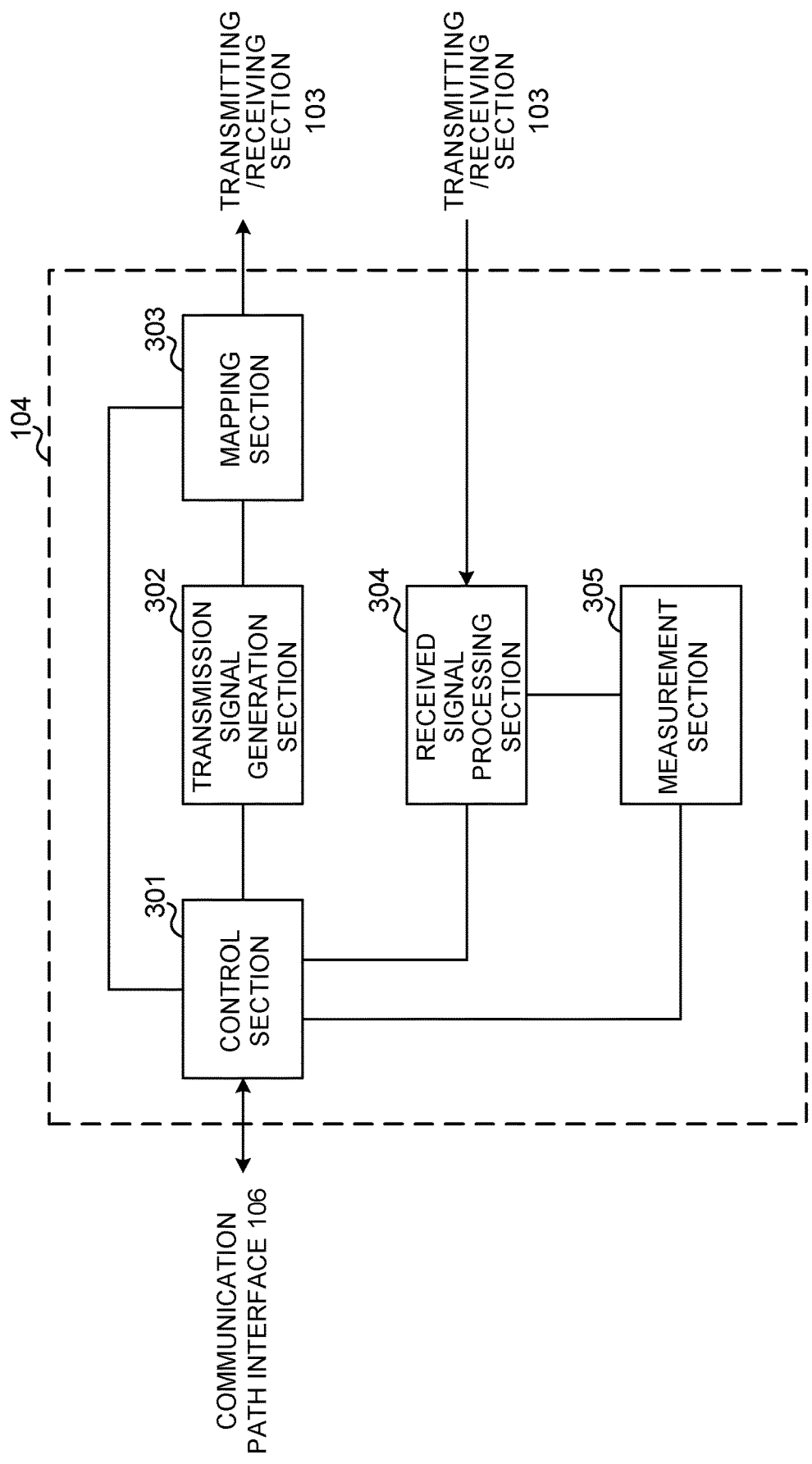
FIG. 19 is a diagram to show an exemplary functional structure of a radio base station according to the present embodiment.

FIG. 19 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals in the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRS, CSI-RS, DMRS, etc.) and so on.

Furthermore, the control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and so forth.

Also, the control section 301 may control the receipt of an uplink control channel (PUCCH) based on first frequency resource information and second frequency resource information. Furthermore, the control section 301 may control the receipt of an uplink control channel (PUCCH) based on first frequency resource information, second frequency resource information, and frequency hopping information. Furthermore, the control section 301 may control the receipt of an uplink control channel (PUCCH) based on the frequency hopping information.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, downlink data signals are subjected to the coding process, the modulation process and so on, by using coding rates, modulation schemes and so forth that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI) and so on. The measurement results may be output to the control section 301.

<User Terminal>

Figure 20:
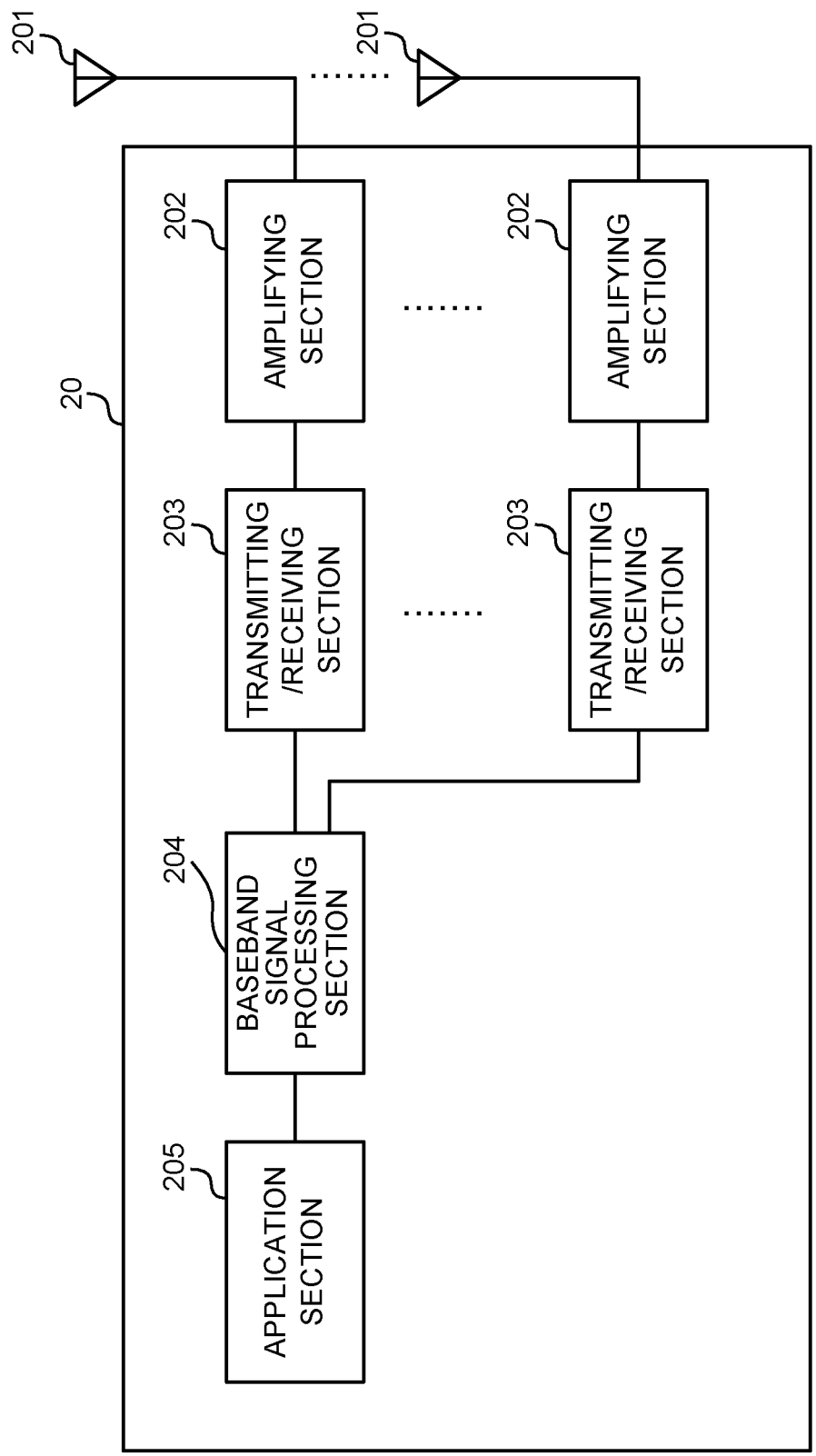
FIG. 20 is a diagram to show an exemplary overall structure of a user terminal according to the present embodiment.

FIG. 20 is a diagram to show an exemplary overall structure of a user terminal according to one embodiment of the present invention. A user terminal 20 has a number of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive first frequency resource information (for example, PUCCH-starting-PRB), which indicates the first frequency resource at the start of an uplink control channel, and second frequency resource information (for example, PUCCH-2nd-hop-PRB), which indicates a second frequency resource after the frequency hopping timing of the uplink control channel. Furthermore, the transmitting/receiving sections 203 may receive frequency hopping information (PUCCH-frequency-hopping), which indicates whether frequency hopping is enabled or not. Furthermore, the transmitting/receiving sections 203 may receive information (for example, PUCCH-F1-number-of-slots, PUCCH-F3-number-of-slots, or PUCCH-F4-number-of-slots) that indicates the number of slots for the uplink control channel (for example, the number of PUCCH slots, the number of PUCCH repetitions, etc.).

Figure 21:
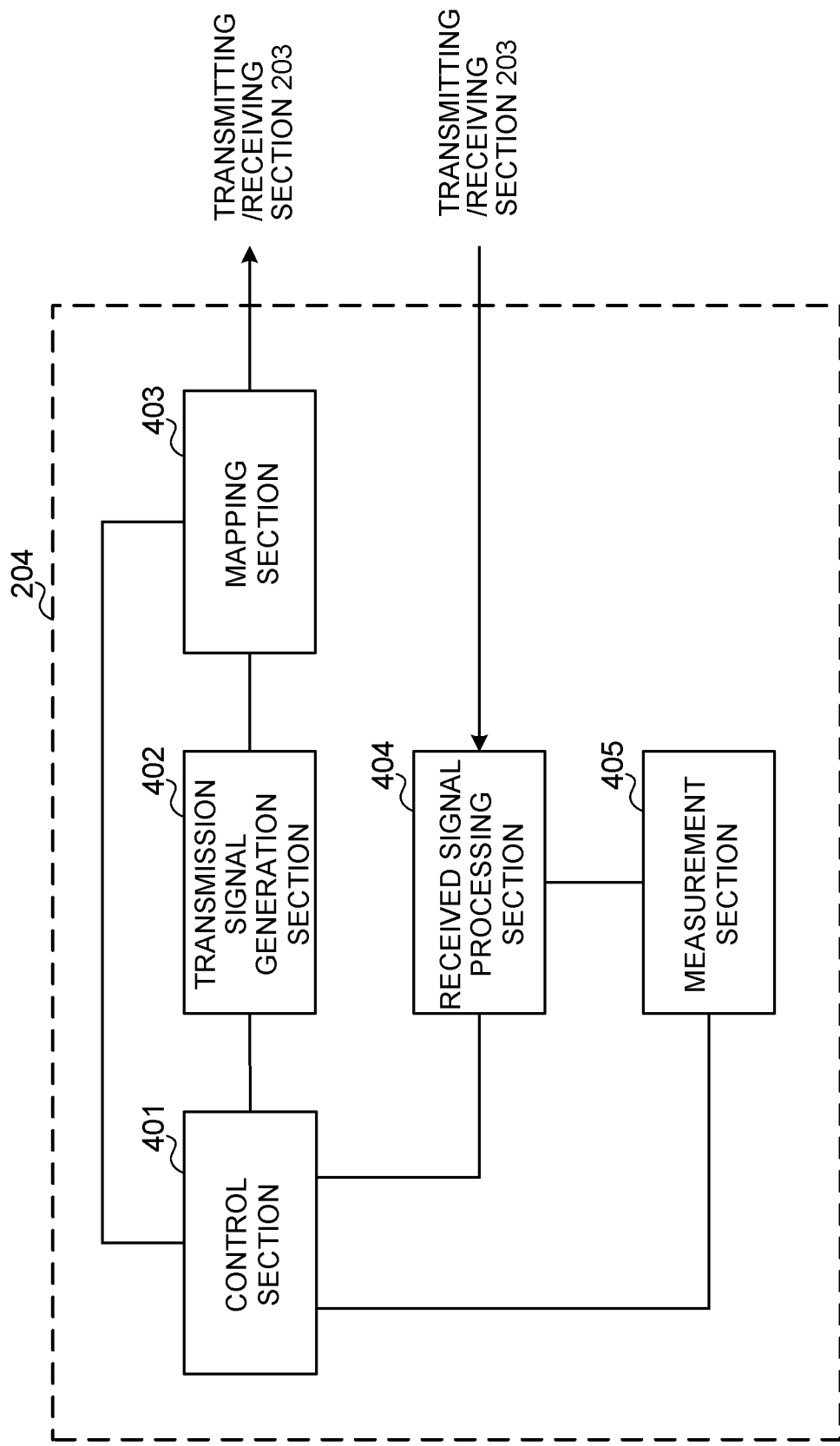
FIG. 21 is a diagram to show an exemplary functional structure of a user terminal according to the present embodiment.

FIG. 21 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

The control section 401 may also control the transmission of an uplink control channel (PUCCH) based on whether or not a second frequency resource, which is indicated in the second frequency resource information (for example, PUCCH-2nd-hop-PRB), is the same as a first frequency resource, which is indicated in first frequency resource information (for example, PUCCH-starting-PRB).

Also, based on whether or not the second frequency resource, which is indicated in the second frequency resource information, is the same as the first frequency resource indicated in the first frequency resource information, and based on frequency hopping information (for example, PUCCH-frequency-hopping), the control section 401 may determine at least one of the spreading factor of the time-domain orthogonal cover code to apply to the uplink control channel, the configuration of the demodulation reference code included in the uplink control channel, and the base sequence to apply to the uplink control channel (first to third examples).

Furthermore, if the frequency hopping information indicates enablement and the second frequency resource indicated in the second frequency resource information is different from the first frequency resource indicated in the first frequency resource information, the control section 401 may change the base sequence at the timing of frequency hopping (example 3-2 in the third example).

Furthermore, the control section 401 may judge whether or not to apply frequency hopping, based on whether or not the second frequency resource indicated in the second frequency resource information is the same as the first frequency resource indicated in the first frequency resource information (fourth example).

Also, based on whether or not the second frequency resource, which is indicated in the second frequency resource information, is the same as the first frequency resource indicated in the first frequency resource information, and the control section 401 may determine at least one of the spreading factor of the time-domain orthogonal cover code to apply to the uplink control channel, the configuration of the demodulation reference code included in the uplink control channel, and the base sequence to apply to the uplink control channel (fifth to seventh examples).

Furthermore, when the number of slots is greater than one, the control section 401 may control the repetition transmission of the uplink control channel over a number of slots by applying at least one of the spreading factor of the time-domain orthogonal cover code, the configuration of the demodulation reference code, and the base sequence, to the uplink control channel, based on the frequency hopping information.

Also, for the time-domain orthogonal cover code to apply to the uplink control channel, a first spreading factor for non-frequency hopping (for example, an SF without intra-slot hopping (that is, with no intra-slot hopping)) and a second spreading factor for frequency hopping (for example, an SF with intra-slot hopping) may be configured in advance, and the control section 401 may apply the first spreading factor to the uplink control channel if the frequency hopping information indicates disablement, and apply the second spreading factor to the uplink control channel if the frequency hopping information indicates enablement.

Also, one spreading factor (for example, an SF without intra-slot hopping (that is, with no intra-slot hopping)) and two spreading factors (for example, a first-hop SF and a second-hop SF in SFs with intra-slot hopping) may be configured in advance, for the time-domain orthogonal cover code to apply to the uplink control channel, and the control section 401 may apply the one spreading factor to the uplink control channel when the frequency hopping information indicates disablement, and apply the two spreading factors before and after the timing of frequency hopping in the uplink control channel, respectively, when frequency hopping information indicates enablement (eighth example).

Furthermore, the control section 401 may apply one base sequence to the uplink control channel, regardless of whether the frequency hopping information indicates enablement or not (tenth example and example 10-1).

Also, when the frequency hopping information indicates enablement, the control section 401 may change the base sequence to apply to the uplink control channel at the timing of frequency hopping in the uplink control channel (tenth example and example 10-2).

Also, a first demodulation reference signal format and a second demodulation reference signal format may be configured in advance, for the demodulation reference code included in the uplink control channel, and the control section 401 may apply the first demodulation reference signal format to the uplink control channel when the frequency hopping information indicates disablement, and apply the second demodulation reference signal format to the uplink control channel when the frequency hopping information indicates enablement (ninth example).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

<Hardware Structure>

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 22:
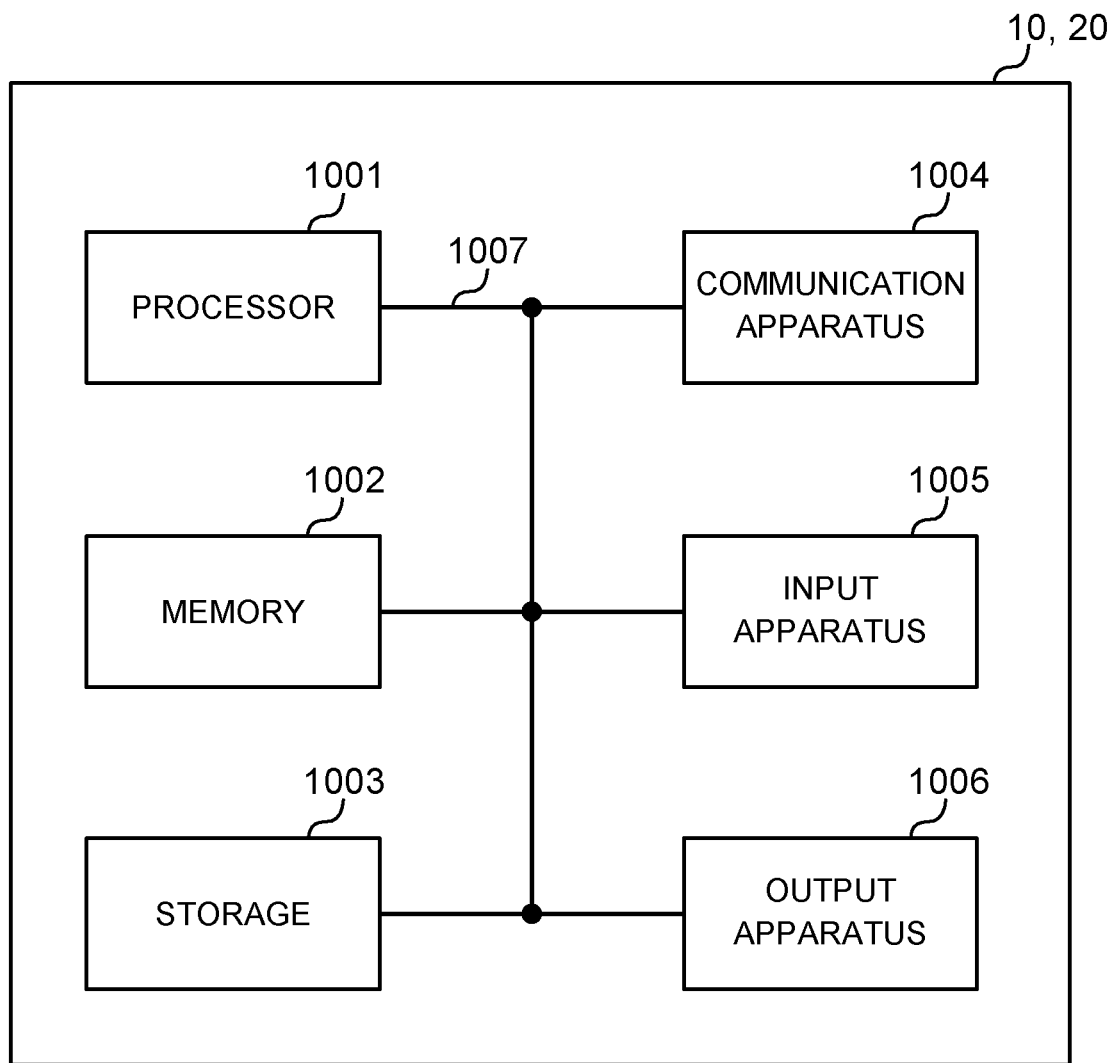
FIG. 22 is a diagram to show an exemplary hardware structure of a radio base station and a user terminal according to the present embodiment.

For example, the radio base station, user terminals and so on according to one embodiment of the present invention may function as a computer that executes the processes of the radio communication method of the present invention. FIG. 22 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. Note that, the hardware structure of a radio base station 10 and a user terminal 20 may be designed to include one or more of each apparatus shown in the drawings, or may be designed not to include part of the apparatus.

For example, although only one processor 1001 is shown, a number of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or multiple slots in the time domain. A subframe may be a fixed time duration (for example, 1 ms), which does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a number of contiguous subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a number of contiguous subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a number of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of reporting information is by no means limited to those used in the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIB s) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a first information indicating a number of slots of a physical uplink control channel (PUCCH) and a second information indicating a PUCCH resource; and
a processor that uses a sequence for the PUCCH,
wherein when the number of the slots is larger than one, and when an enabling of an intra-slot frequency hopping, a starting physical resource block (PRB) which is a first PRB in a first hop, and a second hop PRB which is a first PRB in a second hop are configured for the PUCCH resource, even when the second hop PRB and the starting PRB are located at a same position in the frequency direction, the sequence varies depending on a slot in which the sequence is used and whether the sequence is used in the first hop or the second hop, and
wherein even when the second hop PRB and the starting PRB are located at a same position in the frequency direction, the processor determines a position of a demodulation reference signal for a PUCCH format, allocated to four symbols and used for transmission of uplink control information (UCI) of more than two bits, according to whether or not the enabling of the frequency hopping is configured for the PUCCH resource.

2. The terminal according to claim 1, wherein when the second hop PRB is equal to the starting PRB, the processor uses an orthogonal sequence which has a length depending on whether or not the enabling of the frequency hopping is configured for the PUCCH resource.

3. The terminal according to claim 1, wherein the processor uses the sequence for at least one of an uplink control information and a demodulation reference signal.

4. The terminal according to claim 2, wherein the processor uses the sequence for at least one of an uplink control information and a demodulation reference signal.

5. The terminal according to claim 1, wherein the sequence is a low-peak to average power ratio (low-PAPR) sequence.

6. The terminal according to claim 2, wherein the sequence is a low-peak to average power ratio (low-PAPR) sequence.

7. A radio communication method for a terminal comprising:
receiving a first information indicating a number of slots of a physical uplink control channel (PUCCH) and a second information indicating a PUCCH resource; and
using a sequence for the PUCCH,
wherein when the number of the slots is larger than one, and when an enabling of an intra-slot frequency hopping, a starting physical resource block (PRB) which is a first PRB in a first hop, and a second hop PRB which is a first PRB in a second hop are configured for the PUCCH resource, even when the second hop PRB and the starting PRB are located at a same position in the frequency direction, the sequence varies depending on a slot in which the sequence is used and whether the sequence is used in the first hop or the second hop, and
wherein even when the second hop PRB and the starting PRB are located at a same position in the frequency direction, the terminal determines a position of a demodulation reference signal for a PUCCH format, allocated to four symbols and used for transmission of uplink control information (UCI) of more than two bits, according to whether or not the enabling of the frequency hopping is configured for the PUCCH resource.

8. A base station comprising:
a transmitter that transmits a first information indicating a number of slots of a physical uplink control channel (PUCCH) and a second information indicating a PUCCH resource; and
a receiver that receives the PUCCH using a sequence,
wherein when the number of the slots is larger than one, and when an enabling of an intra-slot frequency hopping, a starting physical resource block (PRB) which is a first PRB in a first hop, and a second hop PRB which is a first PRB in a second hop are configured for the PUCCH resource, even when the second hop PRB and the starting PRB are located at a same position in the frequency direction, the sequence varies depending on a slot in which the sequence is used and whether the sequence is used in the first hop or the second hop, and
wherein even when the second hop PRB and the starting PRB are located at a same position in the frequency direction, the receiver receives a demodulation reference signal for a PUCCH format, allocated to four symbols and used for transmission of uplink control information (UCI) of more than two bits, in a position that is determined according to whether or not the enabling of the frequency hopping is configured for the PUCCH resource.

9. A system comprising a base station and a terminal, wherein
the base station comprises:
a transmitter that transmits a first information indicating a number of slots of a physical uplink control channel (PUCCH) and a second information indicating a PUCCH resource, and
the terminal comprises:
a receiver that receives the first information and the second information; and
a processor that uses a sequence for the PUCCH,
wherein when the number of the slots is larger than one, and when an enabling of an intra-slot frequency hopping, a starting physical resource block (PRB) which is a first PRB in a first hop, and a second hop PRB which is a first PRB in a second hop are configured for the PUCCH resource, even when the second hop PRB and the starting PRB are located at a same position in the frequency direction, the sequence varies depending on a slot in which the sequence is used and whether the sequence is used in the first hop or the second hop, and wherein even when the second hop PRB and the starting PRB are located at a same position in the frequency direction, the processor determines a position of a demodulation reference signal for a PUCCH format, allocated to four symbols and used for transmission of uplink control information (UCI) of more than two bits, according to whether or not the enabling of the frequency hopping is configured for the PUCCH resource.

* * * * *